(12) United States Patent
Elias et al.

(10) Patent No.: US 10,115,170 B2
(45) Date of Patent: Oct. 30, 2018

(54) SYSTEMS AND METHODS FOR IMAGE SEARCHING OF PATENT-RELATED DOCUMENTS

(71) Applicant: LexisNexis, a division of Reed Elsevier Inc., Miamisburg, OH (US)

(72) Inventors: Brian K. Elias, Springboro, OH (US); Matthew C. Morrise, Portland, OR (US); Ray Daley, Springboro, OH (US)

(73) Assignee: Lex Machina, Inc., Menlo Park, CA (US)

( * ) Notice: Subject to any disclaimer, the term of this patent is extended or adjusted under 35 U.S.C. 154(b) by 796 days.

(21) Appl. No.: 14/323,485

(22) Filed: Jul. 3, 2014

(65) Prior Publication Data

US 2014/0317097 A1  Oct. 23, 2014

Related U.S. Application Data

(63) Continuation of application No. PCT/US2013/076160, filed on Dec. 18, 2013.
(Continued)

(51) Int. Cl.
*G06F 17/30* (2006.01)
*G06Q 50/18* (2012.01)
(Continued)

(52) U.S. Cl.
CPC .......... *G06Q 50/184* (2013.01); *G06F 7/00* (2013.01); *G06F 17/30* (2013.01);
(Continued)

(58) Field of Classification Search
CPC ......... G06F 17/30011; G06F 17/30424; G06F 17/30613
See application file for complete search history.

(56) References Cited

U.S. PATENT DOCUMENTS 5,774,833 A * 6/1998 Newman ............... G06F 17/211
704/9
7,162,465 B2   1/2007 Jenssen et al.
(Continued)

OTHER PUBLICATIONS

International Search Report and Written Opinion of International Application No. PCT/US13/76160 dated May 16, 2014.

*Primary Examiner* — Apu Mofiz
*Assistant Examiner* — Sheryl Holland
(74) *Attorney, Agent, or Firm* — Dinsmore & Shohl LLP

(57) ABSTRACT

In one embodiment, a method for searching for drawings found in a set of patent-related documents includes receiving a search query, and searching a parts index for part names matching one or more terms in the search query. The method further includes displaying one or more drawings, wherein the one or more drawings include at least one part name within the search query and the part name is stored within the parts index. In another embodiment, a method for searching for drawings includes receiving a request to search for drawings relating to a select drawing of a patent-related document, extracting parts information from the select drawing, and comparing the extracted parts information with parts information stored in a parts index. The method further includes determining that one or more drawings are similar to the select drawing, and displaying the one or more drawings.

20 Claims, 18 Drawing Sheets

Related U.S. Application Data

(60) Provisional application No. 61/738,703, filed on Dec. 18, 2012, provisional application No. 61/880,449, filed on Sep. 20, 2013.

(51) Int. Cl.
  *G06F 7/00* (2006.01)
  *G06Q 10/10* (2012.01)

(52) U.S. Cl.
  CPC .. *G06F 17/30011* (2013.01); *G06F 17/30112* (2013.01); *G06F 17/30424* (2013.01); *G06F 17/30613* (2013.01); *G06Q 10/10* (2013.01)

(56) References Cited

U.S. PATENT DOCUMENTS

| | | | |
|---|---|---|---|
| 7,792,858 B2 | 9/2010 | Tang et al. | |
| 8,037,086 B1 | 10/2011 | Upstill et al. | |
| 8,161,041 B1 | 4/2012 | Grushetskyy et al. | |
| 8,285,714 B2 | 10/2012 | Ji et al. | |
| 8,392,413 B1 | 3/2013 | Grushetskyy et al. | |
| 8,504,562 B1 | 8/2013 | Ikeda et al. | |
| 2002/0082778 A1* | 6/2002 | Barnett | G06F 17/2715 |
| | | | 702/1 |
| 2003/0225755 A1* | 12/2003 | Iwayama | G06F 17/3071 |
| 2003/0225773 A1 | 12/2003 | Jenssen et al. | |
| 2004/0006459 A1* | 1/2004 | Dehlinger | G06F 17/30707 |
| | | | 704/10 |
| 2005/0216828 A1* | 9/2005 | Brindisi | G06F 17/241 |
| | | | 715/201 |
| 2006/0004730 A1* | 1/2006 | Chan | G06F 17/30864 |
| 2008/0154848 A1* | 6/2008 | Haslam | G06F 17/30011 |
| 2008/0281860 A1* | 11/2008 | Elias | G06F 17/30716 |
| 2009/0019038 A1* | 1/2009 | Millett | G06F 17/30613 |
| 2009/0228777 A1* | 9/2009 | Henry | G06F 17/30017 |
| | | | 715/230 |
| 2009/0276694 A1* | 11/2009 | Henry | G06F 17/30616 |
| | | | 715/243 |
| 2009/0299853 A1* | 12/2009 | Jones | G06Q 30/02 |
| | | | 705/14.46 |
| 2010/0131513 A1* | 5/2010 | Lundberg | G06Q 10/10 |
| | | | 707/741 |
| 2011/0047166 A1 | 2/2011 | Stading et al. | |
| 2011/0055206 A1 | 3/2011 | Martin et al. | |
| 2011/0137893 A1 | 6/2011 | Shnitko et al. | |
| 2011/0307499 A1* | 12/2011 | Elias | G06F 17/30011 |
| | | | 707/750 |
| 2012/0124041 A1* | 5/2012 | Bawri | G06Q 10/107 |
| | | | 707/728 |
| 2012/0278341 A1* | 11/2012 | ogilvy | G06Q 10/00 |
| | | | 707/749 |
| 2012/0310930 A1 | 12/2012 | Kumar et al. | |
| 2013/0246436 A1* | 9/2013 | Levine | G06F 17/241 |
| | | | 707/741 |
| 2013/0262968 A1* | 10/2013 | Gartman | G06F 17/2705 |
| | | | 715/202 |
| 2014/0317001 A1* | 10/2014 | Elias | G06F 7/00 |
| | | | 705/310 |

\* cited by examiner

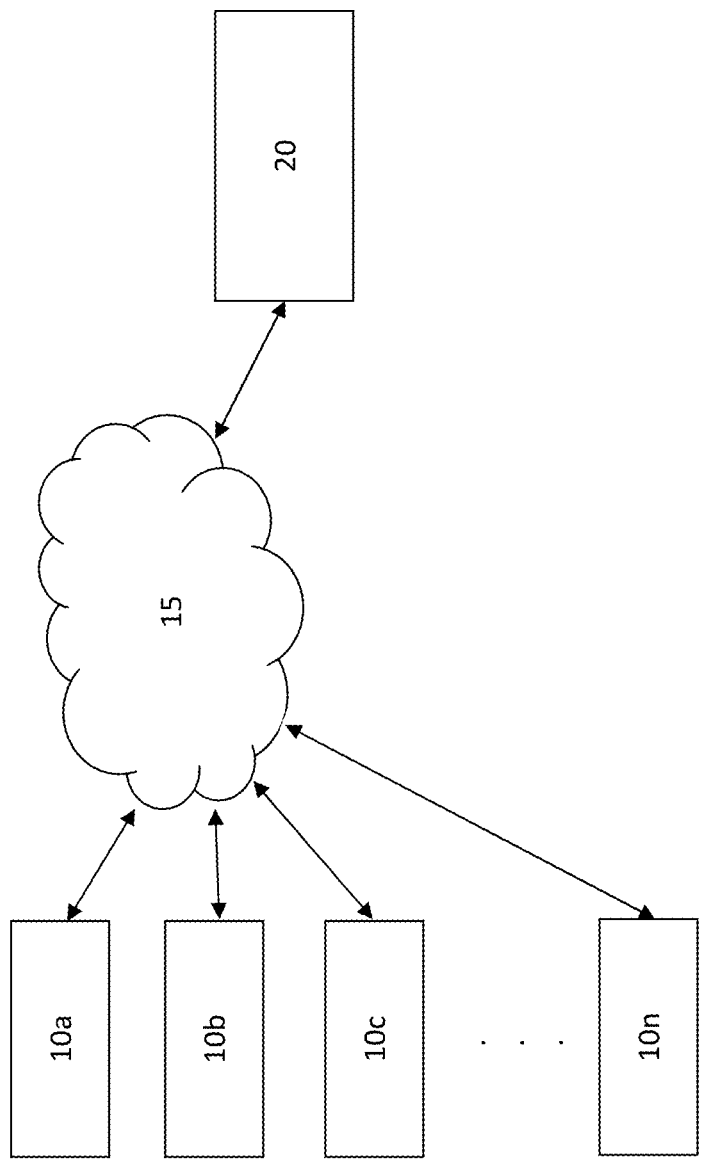

SYSTEMS AND METHODS FOR IMAGE SEARCHING OF PATENT-RELATED DOCUMENTS

CROSS REFERENCE TO RELATED APPLICATIONS

This application is a continuation of PCT/US13/76160, entitled Systems and Methods for Patent-Related Document Analysis and Searching filed on Dec. 18, 2013, which claims priority to U.S. Provisional Patent Application No. 61/738,703, entitled "Systems and Methods for Searching Documents and Related Images" and filed on Dec. 18, 2012, and U.S. Provisional Patent Application No. 61/880,449, entitled "Systems and Methods for Patent-related document Analysis and Image Searching" and filed on Sep. 20, 2013.

TECHNICAL FIELD

The present disclosure generally relates to the field of computerized systems. More particularly, disclosed embodiments relate to computerized systems and methods for patent-related document analysis and image searching.

BACKGROUND

Various databases and tools exist for patent-related documents, such as those provided by the U.S. Patent and Trademark Office and foreign patent agencies. Other search tools also include MicroPatent™, PatBase™, and Delphion™. These search tools may permit users to search for patent-related documents using search terms and other criteria.

Traditional search tools, however, are often limited in their ability to search, filter, and analyze large numbers of patent-related documents. While traditional search tools may locate large numbers of patent-related documents responsive to a query, they do not provide an effective user interface for filtering and analyzing the patent-related documents to find documents of interest to a user. Traditional search tools also do not allow a user to search for particular patent drawings of patent documents, which may assist a user in finding relevant patent-related documents.

Further, existing patent-related document tools do not enable a user to verify if there is support for claim terms that are present in claims. For example, the Detailed Description of the patent-related document may use different terminology than a particular claim term. Although the claim term may not have literal support, it may have non-literal support in the form of term variants in the Detailed Description. Accordingly, there exists a need for improved search and analysis tools for patent-related documents.

SUMMARY

In one embodiment, a computer-implemented method for searching for drawings found in a set of patent-related documents includes receiving, by a computer, a search query, and searching a parts index for part names matching one or more terms in the search query. The parts index includes part names and part numbers regarding the set of patent-related documents, wherein the part names and the part numbers are associated with drawings present in the set of patent-related documents. The method further includes displaying one or more drawings, wherein the one or more drawings include at least one part name within the search query and the part name is stored within the parts index.

In another embodiment, a computer-implemented method for searching for drawings found in a set of patent-related documents includes receiving, by a computer, a request to search for drawings relating to a select drawing of a patent-related document, extracting parts information from the select drawing, and comparing the extracted parts information with parts information stored in a parts index in association with a plurality of drawings defined by the set of patent-related documents. The method further includes, based on the comparison, determining that one or more drawings are similar to the select drawing, and displaying the one or more drawings.

In yet another embodiment, a computer-implemented method for searching for drawings found in a set of patent-related documents includes receiving, a by computer, a request to search for drawings relating to a select drawing of a patent-related document, extracting one or more part numbers from the select drawing, determining, from a text of the patent-related document, one or more part names associated with the one or more part numbers, and searching a parts index for the one or more part names, the parts index including part names and part numbers included in the set of patent-related documents, wherein the part names and part numbers are associated with drawings present in the set of patent-related documents. The method further includes, determining one or more drawings that illustrate the one or more part names, and displaying the one or more drawings.

BRIEF DESCRIPTION OF THE DRAWINGS

FIG. 1 schematically illustrates an exemplary system consistent with one or more embodiments described and illustrated herein;

DETAILED DESCRIPTION

Figure 2A:
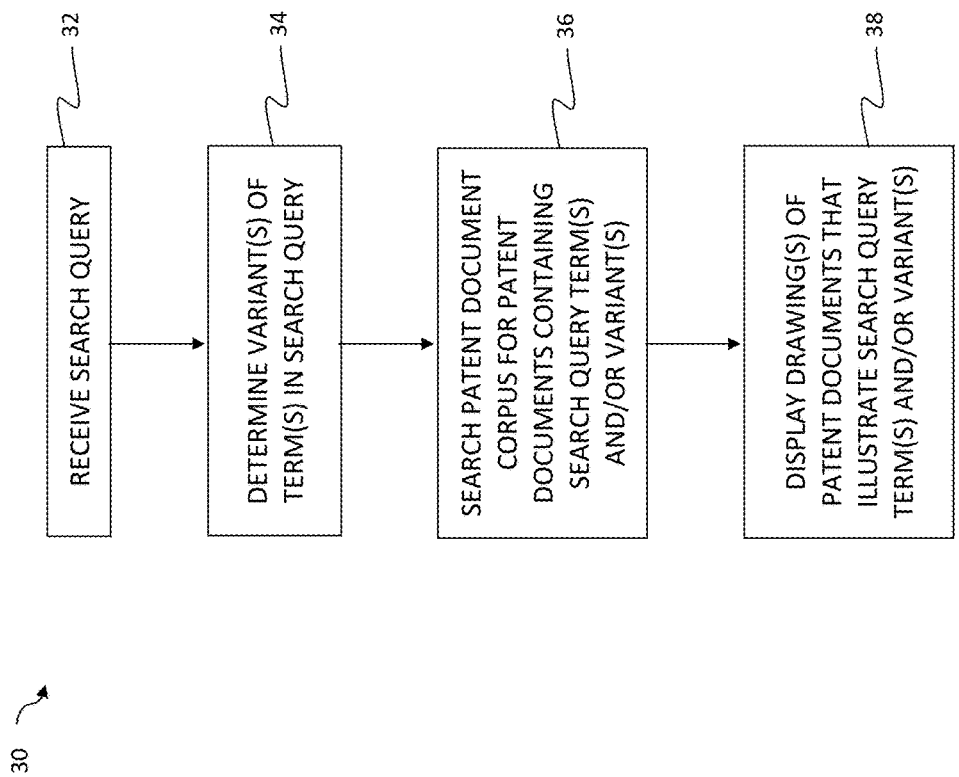
FIG. 2A is a flow chart depicting an exemplary process for text to image searching according to one or more embodiments described and illustrated herein.

Embodiments of the present disclosure are directed to systems and methods for identifying, aggregating, indexing, conceptually interrelating and searching patent part expressions and their related drawings for enabling effective exploration of one or more part expressions and text-to-image and image-to-image patent prior art searching. Embodiments are also directed to systems and methods for indicating conceptual support in a specification of a patent-related document for terms within claims of the patent-related document that do not have literal support in the specification. Further, embodiments are also directed to systems and methods for indicating conceptual support for a term in one or more compared documents when the exact term does not appear in the one or more compared documents.

Embodiments disclosed herein provide systems and methods for searching a parts thesaurus for search term variants corresponding to search terms. As described in more detail below, the parts thesaurus may be generated using various information included in a corpus of documents. Consistent with disclosed embodiments, the parts thesaurus may be used, inter alia, to analyze one or more documents in the corpus of documents. The following discussion may refer to various legal documents, such as patent-related documents (for example, patents and published patent applications). However, one of ordinary skill in the art will understand that systems and methods consistent with the disclosed embodiments may analyze any type of document.

As used in the context of patent-related documents, a "part" may refer to a component of an invention described in a patent-related document. For example, a part may be component of a drawing reference, which may include both the part expression (i.e., part name) and an identifier, such as a reference number (or a part number). A "claim element" (or "claim term") may refer to a component of an invention included in a claims section of a patent-related document. In general, terms such as "phrase," "component," "part," "element," "term," and the like, may refer to any word or set of words in a document.

Generally, embodiments utilize a comprehensive patent-based parts index (millions of discrete part expressions) derived exclusively from the U.S. patent corpus, although sources other than the U.S. patent corpus may be used to derive the parts index (e.g., a PCT parts index, EPO parts index, Canadian parts index, etc). The parts index includes part variant relationships derived from the patent text that conceptually interrelate part expressions (i.e., part names) enabling users to identify useful language variants for formulating queries, generating analytics, or identifying patents covering similar parts or other numbered items appearing in patent drawings (e.g., parts, flowcharts, symbols, graphs, etc.). By retaining the "bibliographic parentage" of the various parts data, the parts index may be used to pinpoint patents having meaningful structure with specific user desired attributes.

Conceptually related part variants within the parts index define a parts thesaurus. Part variants (i.e., synonyms) may be generated based upon the co-occurrence (i.e., pairings) of any part labels/numbers appearing within a single part reference, as across a series of patent-related documents. These variants are provided in the parts thesaurus, which may be accessed for query expansion, for example.

Various aspects of the parts index, determining and sorting variants using the parts index, parts thesaurus, and text-to-image searching are described in U.S. Pat. Publ. No. 2011/0307499 entitled "Systems and Methods for Analyzing Patent Related Documents" filed on Jun. 11, 2010.

More specifically, the parts thesaurus comprises consolidated part reference data (from the parts index), wherein part variants (particularly synonyms) are generated based upon the co-occurrence (pairings) of any part labels appearing within a single part reference, as across a series of patents. For those pairings occurring only once, or having the same number of matches, the number of patents containing both synonyms of the pair (as within a single figure description (ideal) or as across a patent) are utilized for ranking.

Another approach of grouping parts in the part reference data as parts thesaurus entries is to group all part phrases that have the same last word and that appear in a minimum number of patents. For example, the parts "door," "front door," and "back door" may be grouped together as an entry in the parts thesaurus, provided each was found in a minimum number of patents.

Yet another approach of grouping parts in the part reference data as parts thesaurus entries is to group parts that have the same part number but no common words together. For example, if a patent-related document contains "hole 10" and "opening 10," these may be grouped as a thesaurus entry because they share no common words. If a patent-related document contained "front door 15" and "back door 15," these would not be grouped together because both parts contain the word "door."

In all of the above-described instances, a threshold may be set to pare down the acceptable part name candidates into variants based on frequency (e.g., more than x-number of patent-related documents are needed to render the candidate acceptable).

Derived part variants that do not exist separately in a patent-related document may be generated by breaking existing part phrases into individual parts of speech and then selectively removing modification tokens (e.g., if a patent-related document only recites "horizontal cylindrical filter," embodiments may construct "horizontal filter," "cylindrical filter," and "filter" as other part phrases for the same patent-related document).

Additionally, weighting may be applied to the strength of the synonym bond using term frequency-inverse document frequency which enables the presentation of the variants to be made based on most-to-least applicable. Articles, prepositions, adjectival noise words (such as right, left, top, bottom, front, back, etc.) may be excluded as noise words in the parts thesaurus if desired. These excluded terms may be captured into a parallel index and clustered via selectable qualifiers (e.g., spatial indicators, physical property indicators, etc.), each clustered variant then having their own related variants. Thus, if a user wishes to retrieve or distinguish particular parts utilizing common qualifiers, this could be done using the variants from the parallel index in combination with the variants from the parts index.

As described below, embodiments provide for text-to-image and image-to-image searching. Embodiments enable users to enter a part expression, or a combination of part expressions, and retrieve back a comprehensive image answer set that can be sorted and filtered utilizing common bibliographic data. If an image (i.e., a drawing of a patent-related document) of particular interest is identified, users may initiate a "more like this image" function to retrieve images that are similar to the selected image. Resultant answer sets may be available for further analysis and processing. Accordingly, users are able to quickly retrieve, browse, filter and identify patents having desired points of structure or illustrated concepts, rendering their research far more efficient, productive and thorough.

Embodiments of the present disclosure also utilize the parts index and related parts thesaurus to assist users in identifying non-literal support of one or more terms in either a single patent-related document or between compared documents. Users may desire to determine if there is support for a claim term within the specification (e.g., the Detailed Description section) of a patent-related document. Literal support means that the exact term or phrase used in the claims is recited in the corresponding specification or disclosure. For example, the claim term "cell phone" may have literal support in the specification when the phrase "cell phone" is recited and used in the Detailed Description section of the patent-related document. In some instances, literal support may not be found for one or more claim terms or phrases. However, there may be conceptual support for claim terms or phrases where there is not literal support. Non-literal, conceptual support is present when a variant of a term or phrase is used in the specification or disclosure rather than the exact term or phrase. For example, the phrase "mobile phone" may be a variant of "cell phone" as provided by the parts thesaurus. Accordingly, non-literal, conceptual support for the phrase "cell phone" appearing in the claims of a patent-related document may be present when the phrase "mobile phone" is used in the Detailed Description section.

Another example includes the claim term "forming concrete members," wherein the word "forming" may not have literal support in the corresponding disclosure. In this case, variants of the word "forming" found in the disclosure, such as "manufacturing" or "casting," may provide non-literal support for the claim term. Moreover, variants may be analyzed to determine the scope of each variant relative to the claim term. Referring to the above example, the variant "manufacturing" may be determined to be broader in scope than the word "forming" included in the claim term, whereas the variant "casting" may be determined to be narrower in scope.

Similarly, embodiments may assist a user that is interested in determining if there is literal or non-literal support for a term or phrase appearing in a first document provided in a compared document (or multiple compared documents). For example, a user may be interested to see if there is support for a claim term in a provisional patent with respect to an issued patent claiming priority to the provisional patent. In another example, an issued patent may be compared with a patent publication. As described above, variants of terms/phrases may be utilized to determine if there is non-literal, conceptual support in compared documents (e.g., non-literal, conceptual support for "cell phone" when the phrase "mobile phone" appears in a compared document).

As stated above, text-to-image searching may be performed consistent with disclosed embodiments. Generally, parts information found in patent drawings may be extracted and stored, in association with respective drawings, into a database or index. Text queries, for example, search queries received from a user, may then be matched against the stored parts information in the parts index to retrieve drawings containing parts information corresponding to a text query. Further, image-to-image searching is also provided in some embodiments, wherein drawings similar to one or more drawings may also be retrieved. Parts information associated with a first drawing may be compared with parts information associated with a second drawing. Based on one or more such comparisons, drawings determined to be similar to an initial set of drawings may be retrieved.

FIG. 1 is a diagram schematically illustrating an exemplary system that may be used to implement disclosed embodiments, including exemplary system components. The components and arrangement, however, may vary. For example, clients 10*a*-10*n* (collectively referred to as clients 10), network 15, and network server 20 may be implemented in various ways. Clients 10, which are configured as computing devices, may each include one or more general purpose computers, mobile phones, or any handheld devices capable of communication over a network. Network 15 may include a local area network ("LAN") or other network that is a portion of a larger network or system of networks (e.g., an enterprise network). Network 15 may also include the Internet. Network server 20 may include a plurality of servers and/or other networking devices.

Clients 10 and network server 20 may include combinations of hardware and/or software configured consistent with the teachings presented herein. For example, clients 10 and network server 20 may include one and/or more processors or microprocessors. Likewise, clients 10 and network server 20 may include one or more volatile or non-volatile, magnetic, semiconductor, tape, optical, removable, nonremovable, or other type of storage device or computer-readable medium. The computer-readable medium may store instructions that, when executed, cause the one or more processors and/or microprocessors to perform functions consistent with disclosed embodiments. Further, clients 10 and network server 20 may also be configured with an operating system (not shown), for example, Microsoft Windows™, Unix™, Linux™, Solaris™, and Apple OS X™. The choice of operating system, and even to the use of an operating system, is not critical to any embodiment. It should also be understood that embodiments described herein may be performed using a single computing device without the use of a network or network server.

Text-to-image searching of patent-related documents will now be described. Referring to FIG. 2A, a flow chart 30 depicting an exemplary process of text-to-image searching of patent-related documents is illustrated. Initially, a search query is received at block 32. The search query may be a traditional search query comprising one or more search terms (e.g., part names) entered into a text field by a user. The search query may also be provided by selection of one or more part names provided in a list. In some embodiments, search queries may be formulated by using Boolean logic, whereby part names may be utilized by Boolean operators such as "AND," "OR," "ANDNOT," etc. Once the search query is received, one or more variants are optionally obtained at block 34. The variants may be obtained by utilizing the parts thesaurus described above. For example, for a search query including the phrase "concrete anchor," variants such as "ground anchor," "expansion anchor," "anchor assembly" and the like may be returned. In some embodiments, the user may be enabled to select which variants he or she would like to have searched. In other embodiments, variants are not determined.

Next, patent-related documents are searched to surface patent-related documents containing the search query terms and/or variants of the search query terms at block 36. Because the parts index described above includes part names, associated part numbers, and bibliographic information, the parts index may be searched using the search query and/or variants to surface patent-related documents having drawings relevant to terms of the search query and/or their variants. For example, the parts index may be searched to locate drawings of patent-related documents that include part names and associated part numbers that correspond to the terms of the search query and/or their variants. Next, the relevant drawings may be displayed to the user in a graphical interface at block 38.

It is noted that filters may also be utilized to limit the drawings returned from the text search. Example filters include, but are not limited to, classification, inventor name, assignee name, and issue or publication date.

Figure 2B:
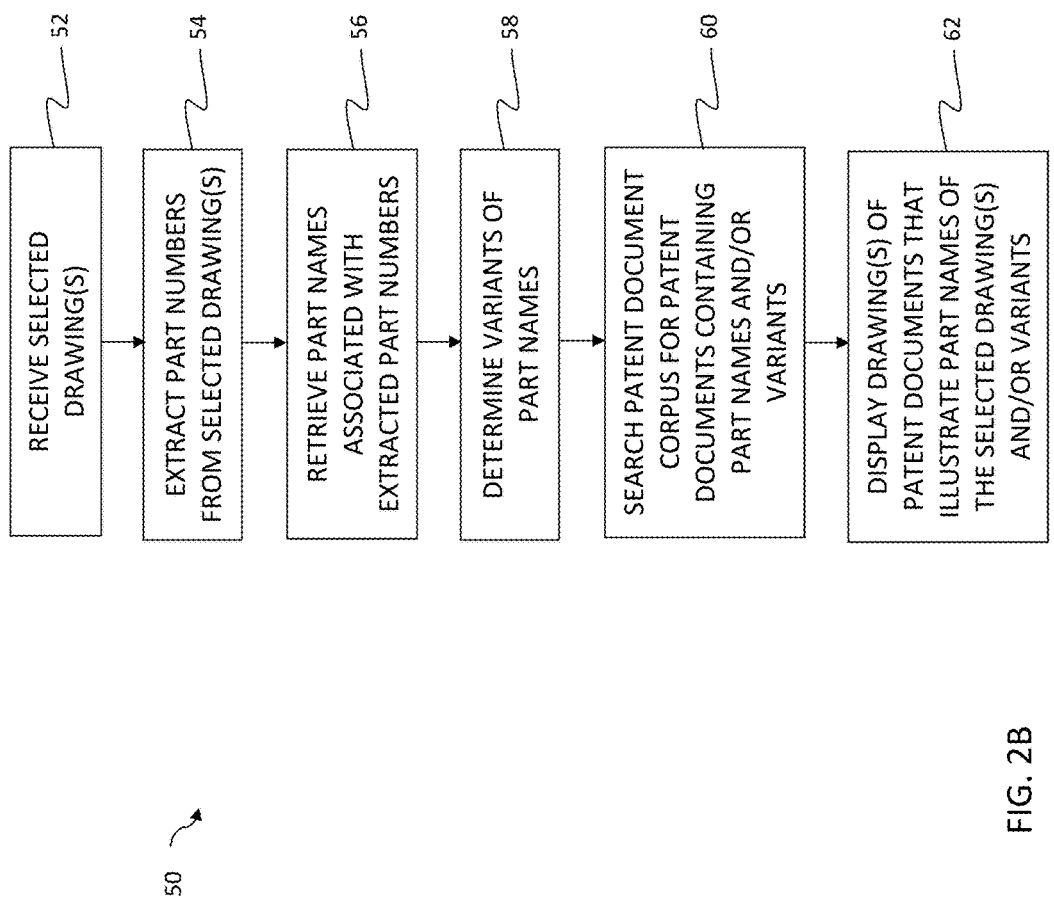
FIG. 2B is a flow chart depicting an exemplary process for image-to-image searching according to one or more embodiments described and illustrated herein.

Embodiments of the present disclosure also enable users to perform image-to-image searching wherein a patent drawing is used to search for similar patent drawings. Referring now to FIG. 2B, a flowchart 50 depicting an exemplary process for image-to-image searching is illustrated. At block 52 a drawing (or drawings), such as a patent drawing, is received. For example, a user may select a patent drawing that is presented in a graphical interface. Next, at block 54, the system extracts part numbers from the selected drawing. For example, optical character recognition may be utilized to detect and extract the part numbers from the selected drawing. The extraction process may be performed after receiving the selected drawing, or the selected drawing may have been pre-processed.

Next, the part names associated with the extracted part numbers are retrieved at block 56. As an example and not a limitation, an extracted part number "10" of the selected drawing may be associated with the phrase "concrete anchor" in the text of the patent-related document associated with the selected drawing. In this manner, the system determines all of the part names associated with the extracted part numbers of the selected drawing. In one embodiment, the parts index may be used to determine the part names associated with the part numbers. More specifically, the parts index includes bibliographic information (e.g., patent numbers and/or published patent application numbers) associated with the part names and part numbers stored therein. Accordingly, the parts index may be used to determine the part names for the numbers extracted from the selected drawing of a particular patent-related document.

In some embodiments, variants of the extracted part names may be determined at block 58. For example, the parts thesaurus described above may be accessed to determine the variants. The variants may be used for query expansion, for example. In other embodiments, variants are not determined.

At block 60, the patent-related document corpus is searched for drawings of patent-related documents containing the extracted part names and/or variants. More specifically, the extracted part names and variants, if utilized, are used as a search query to retrieve relevant patent-related documents. In some embodiments, the user may select which of the extracted part names and/or variants he or she would like to search. As an example and not a limitation, the user may choose to include the phrase "concrete anchor" but not the term "shaft" that was also extracted from the selected drawing.

In some embodiments, the patent-related document corpus may be searched by searching the parts index for the extracted part names and/or variants. Patent-related documents containing the extracted part names and/or variants (or some portion of the part names and/or variants) may be determined. The drawings of the returned patent-related documents containing the extracted part names and/or variants are determined and displayed to the user in a graphical interface at block 62. In this manner, a user may perform a "more like this image" to retrieve similar drawings from other patent-related documents within the corpus. Example filters may also be included to filter images, such as, but not limited to, classification, inventor name, assignee name, and issue or publication date.

Figure 3:
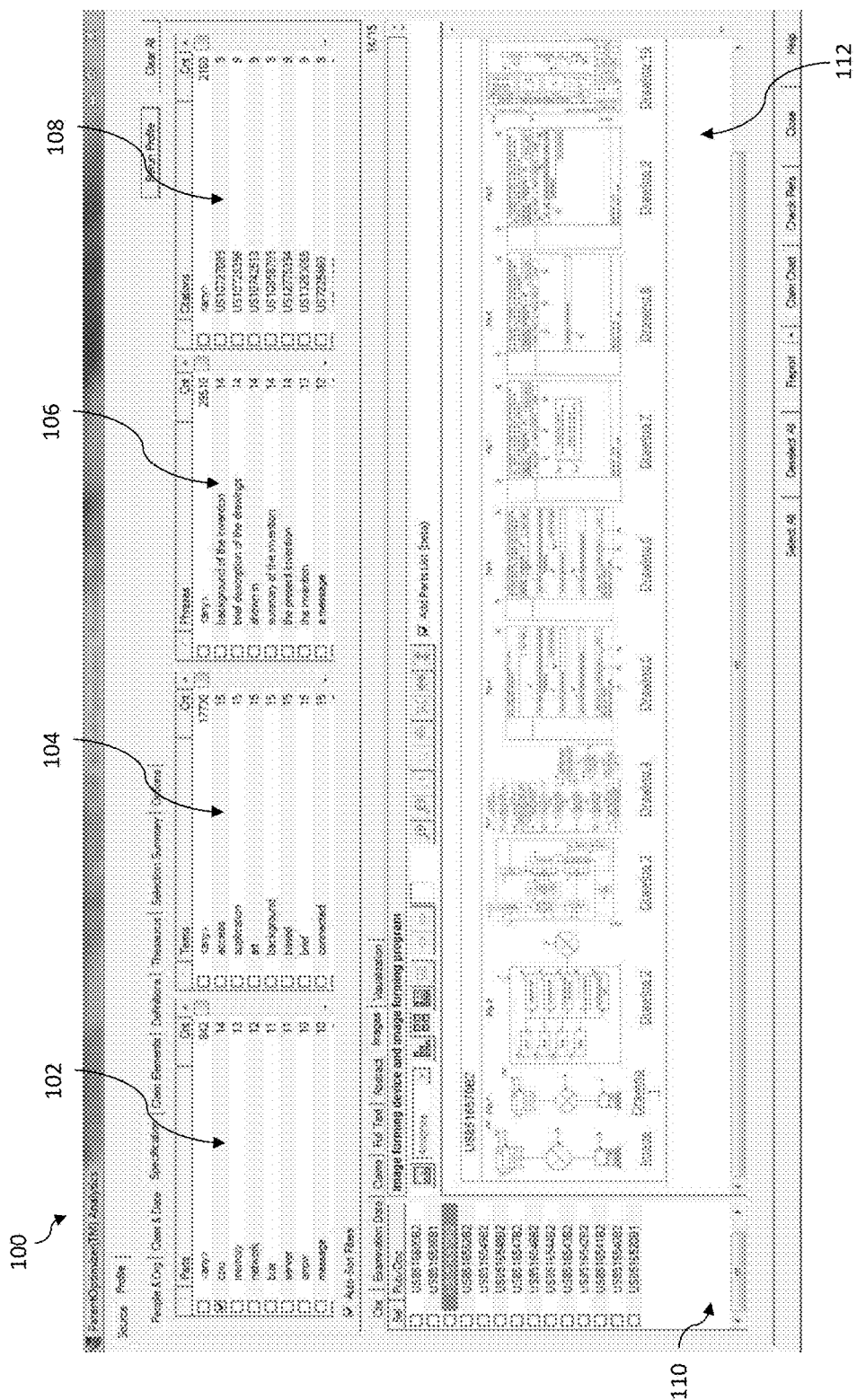
FIGS. 3 and 4 illustrate an exemplary graphical interface for viewing patent images according to one or more embodiments described and illustrated herein.

Embodiments of the present disclosure also enable users to utilize a variety of data filters, including a part expressions filter, to define a set of patent drawings having members containing the desired user attributes. Referring to FIG. 3, an example graphical interface 100 for viewing patent drawings is depicted. The illustrated graphical interface 100 includes a drawing display region 112 for displaying drawings of one or more selected patent-related documents meeting applied data filters, a patent-related document selection region 110 that allows a user to select one or more patent-related documents to evaluate, and several filter regions, including a parts region 102 to filter by part names appearing in the patent-related document, a terms region 104 to filter by terms appearing in the patent-related document, a phrases region 106 to filter by phrases, and a citations region 108 to filter by citation.

Figure 4:
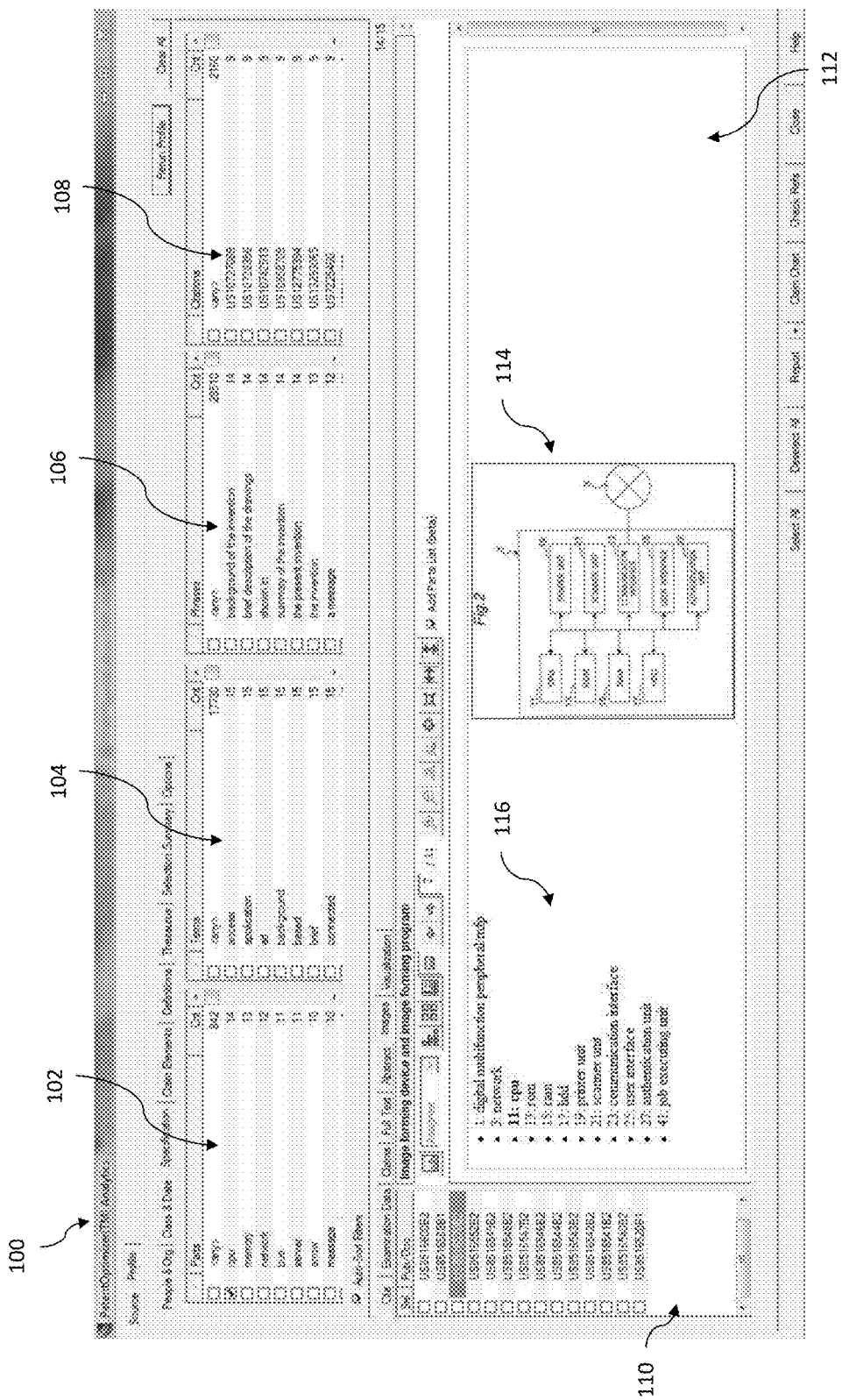

Patent drawings associated with one or more patent-related documents are displayed in the drawing display region 112. When a particular patent drawing is selected from the set, a list of all of the part names and part numbers contained in the selected drawing is presented alongside the drawing. FIG. 4 depicts the graphical interface 100 of FIG. 3 with the second drawing selected. The selected drawing is depicted in a drawing display region 114, and the associated part names and part numbers are listed in a parts listing region 116. The part numbers are extracted from the selected drawing, such as by optical character recognition, for example. The part numbers may be extracted upon selection by the user, or may be preprocessed and available upon selection. As described above, the parts index may be utilized to determine the part names associated with the extracted part numbers. In some embodiments, part names selected in the parts region 102 may be bolded or otherwise indicated in the parts listing region 116. In the illustrated example, "11: cpu" is bolded to indicate that this part is selected in the parts region 102.

In some embodiments, hovering a mouse over any of the part numbers appearing in the drawing exposes the related part name in a tooltip. Clicking on a part number in the drawing, or a listed part in the listing of parts, may navigate the user to the full text of the matching patent-related document wherein the selected part is discussed. This enables quick retrieval, inspection and filtering of those drawings having a specific user defined attribute, particularly as related to patent part names contained therein.

Figure 5:
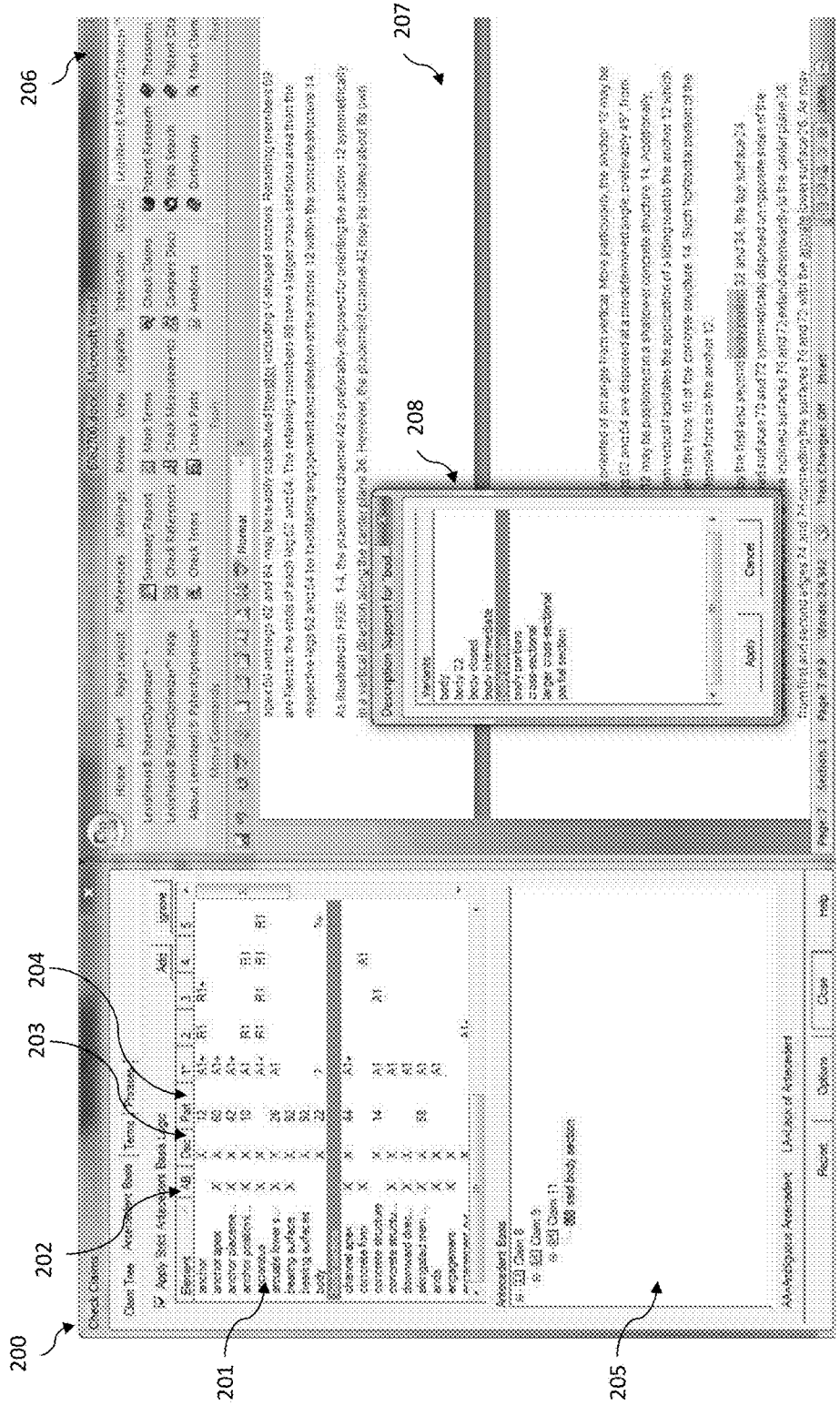
FIG. 5 illustrates an exemplary graphical interface for evaluating claim terms of a patent-related document according to one or more embodiments described and illustrated herein.

Referring now to FIG. 5, embodiments of the disclosure may be used to check for both literal and non-literal support for terms or phrases that appear within claims of a patent-related document. FIG. 5 depicts a graphical interface for evaluating claim terms of a patent-related document. The graphical interface 200 is illustrated as adjacent to a word processing application window 206 that displays a portion of the patent-related document 207 under evaluation. The graphical interface 200 includes a term region 201 and a claim tree region 205. The claim tree region 205 may display all or a portion of the claims in a hierarchical manner, as well as indicate whether or not there is antecedent basis for one or more terms in the claim.

The term region 201 lists each of the terms found within the patent-related document 207. The terms displayed in the term region 201 may be algorithmically determined from the text of the patent-related document. The illustrated term region 201 includes three columns: an antecedent basis column 202, a description support column 203, and a parts column 204. An "X" in the antecedent basis column 202 next to a term indicates that antecedent basis is provided for a particular term (e.g., there is antecedent basis for the claim term "anchor apex" in the illustrated example). Anteceded basis is not provided for the terms in which an "X" is absent (e.g., "anchor" in the illustrated example). The parts column 204 indicates the part number assigned to the claim term in the Detailed Description section and in the figures.

The description support column 203 provides an indication as to whether or not there is support for the claim terms/phrases. When there is literal support present (i.e., the system finds the exact claim term or phrase in the Detailed Description section), an "X" (or other graphical representation) is present in the description support column 203 for the particular claim term or phrase to indicate literal support. When there is no literal support for a claim term or phrase, an "X" is absent in the description support column 203 next to the particular claim term or phrase.

Still referring to FIG. 5, it is noted that the system did not find the example phrase "body section" in the Detailed Description section of the patent-related document. Therefore, because there is no literal support for "body section," an "X" is not present in the description support column 203 in the row associated with the phrase "body section."

In embodiments disclosed herein, the user may request that the system find variants of a claim term or phrase to determine non-literal, conceptual support for those claim terms or phrases without literal support. Variants may be terms or phrases that are conceptually similar to a selected word or phrase and determined using the parts thesaurus as described above (i.e., conceptual variant). Variants may also be terms or phrases that are structurally similar to the selected word or phrase (e.g., similar root terminology) (i.e., structural variant). For example, the phrase "mobile phone" may be a similar variant to the phrase "cellular phone" as they both share the word "phone." Similarly, the phrase "mobile device" may be a similar variant to the phrase "mobile phone" because both phrases include the word "mobile." Users may select to find variants that are conceptually similar to a selected word or phrase (e.g., a claim term), are structurally similar to the selected word or phrase, or both.

The parts thesaurus may be utilized to determine and display variants of a selected term or phrase that appears within the patent-related document. The user may then review the list of displayed variants and select one or more of the variants that he or she believe to be conceptually similar to the claim term or phrase. In this manner, the user associates the one or more selected variants with claim term or phrase, and the system then indicates that the variant(s) and the claim term or phrase are associated and non-literal, conceptual support is provided. The description support column 203 may provide a graphical indication on user-defined non-literal support. In the illustrated embodiment, a "U" is provided rather than an "X" to indicate non-literal, conceptual support. It should be understood that other graphical representations of non-literal support may be used.

As an example and not a limitation, a user may right-click (or otherwise select) the claim phrase "body section" to generate a variant display 208 that lists potential variants associated with "body section" (e.g., variants found by the "search for similar" and/or "search for conceptual" methods described above). In some embodiments, when the user selects a claim term or phrase (e.g., "body section"), a pop-up menu may appear that prompts the user to select "search similar" (i.e., find structurally similar variants as described above) or to select "search conceptual" (i.e., find conceptually similar variants as described above). The option to find both structurally similar and conceptually similar variants (and/or to search both types) may also be provided.

In other embodiments, a user may highlight, click, or otherwise select a term or phrase within the actual text of the document (e.g., a part name in the Detailed Description of a patent-related document). A pop-up menu may appear to either display a list of variants, or prompt the user to select how he or she would like to find variants (e.g., search similar, search conceptual, or both as described above). Selection of variant terms or phrases in the list may then navigate the user to the instances of the selected variant(s) within the text of the document.

It should be understood that there are other ways of presenting the list of variants and that embodiments are not limited to the variant display 208. The phrase "body section" may be applied to the parts thesaurus to generate a list of variants. This list of variants may then be compared with the terms and phrases appearing in the text of the patent-related document. Those variants that appear within the text of the patent-related document may then be presented to the user in the variant display 208. The user may then select (e.g., by use of a mouse or a touch screen input) one or more of the variants displayed in the variant display 208. In the illustrated embodiment, the user has selected variant "body portion" to be associated with the claim phrase "body section" displayed in the claim term region 201 of the graphical interface 200. The description support column 203 may then be updated with a "U" (or other indicator) in the row associated with "body section" to indicate that non-literal, conceptual support is present. Selection of the claim phrase "body section" may then highlight (and/or navigate the user to) the instances of claim phrase "body section" as well as variant "body portion" in the text of the patent-related document.

It is noted that the embodiments of determining and displaying variants described above may be utilized when viewing or editing electronic documents other than patent-related documents. Further, the variants described herein may be utilized for purposes other than finding support for claim terms and phrases within a patent-related document. Variants of selected terms or phrases may be determined and displayed within any type of document to assist the user in navigating within the document to terms and/or phrases that are similar to the selected term or phrase. As an example and not a limitation, a user may be viewing a scientific journal article about a particular topic and finds term X interesting. He or she may highlight or select term X to generate a list of variants occurring with the present document. Such variants may be variant terms X', X", and X'". The user may then select a variant term X', X", or X'" to navigate to the location of such a selected variant term within the text of the present document. In this manner, the user may navigate to sections of the scientific journal that discuss one or more topics similar to the discussion regarding selected term X.

Figure 6:
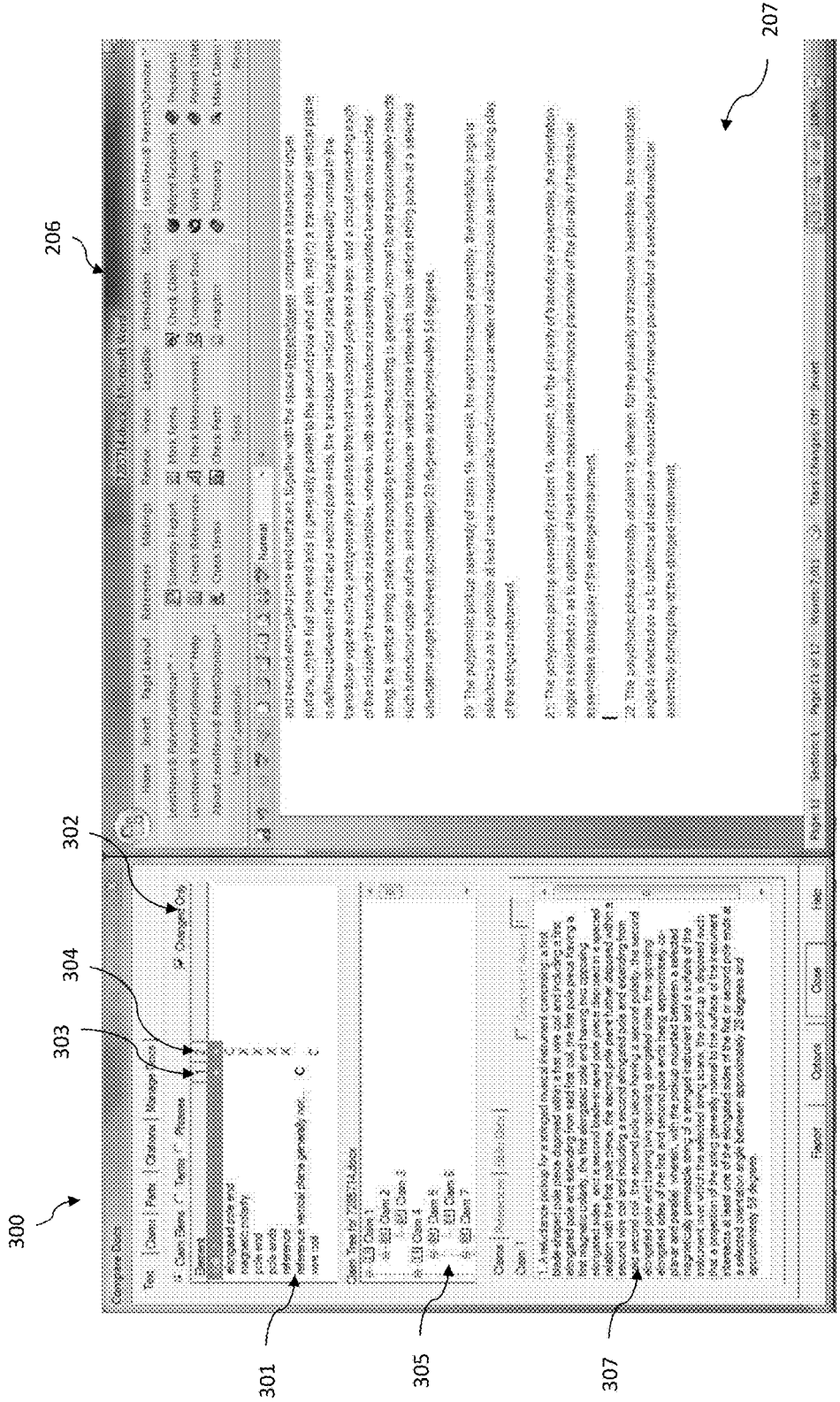
FIGS. 6-8 illustrate an exemplary graphical interface for comparing two or more patent-related documents according to one or more embodiments described and illustrated herein.

Referring now to FIG. 6, embodiments may also enable users to compare documents to determine if support for one or more claim terms/phrases is found in a compared document. As an example and not a limitation, a user may desire to determine if a claim term that appears in an issued patent is supported by a provisional patent application to which the issued patent claims priority. FIG. 6 depicts a graphical interface 300 for comparing two or more patent-related documents. The graphical interface 300 is depicted as adjacent to a word processing application window 206 that displays a portion of one of the patent-related documents 207 under evaluation. The example graphical interface 300 of the illustrated embodiment comprises a claim tree region 305, a claim language region 307, and a terms region 301. The claim tree region 305 may display all or a portion of the claims in a hierarchical manner, as well as indicate whether or not there is antecedent basis for one or more terms and phrases in the claim. The claim language region 307 may display the text of a selected claim.

The terms region 301 displays claim terms and phrases, terms found anywhere in the patent-related document, and phrases (i.e., multi-word terms) found anywhere in the document. In the illustrated embodiment, the "Claim Elems" radio button is selected to display in a list only those terms and phrases appearing in the claims. It is noted that FIG. 6 displays only a sub-set of claim terms and phrases appearing in the claim sets of the compared patent-related documents. The "Changed Only" selection box 302 allows a user to view only those terms or phrases that have changed between compared documents. It should be understood that all claim terms and phrases may be displayed by deselecting the "Changed Only" selection box. The terms region 301 has a first column 303 associated with a first compared patent-related document and a second column 304 associated with a second compared patent-related document. The names of the patent-related documents may also be provided. As an example and not a limitation, hovering a mouse over the first and second column 303, 304 indicators may display the name of the patent-related document in a pop-up text field.

The first and second columns 303, 304 indicate whether the claim term or phrase appears within that particular patent-related document, as well as if there is or is not literal support within the Detailed Description section of that patent-related document (as defined above). If the claim term or phrase is present within the particular patent-related document and there is literal support, an "X" (or other graphical representation) is provided in the column of the particular patent-related document and in the row associated with the claim term or phrase. As an example and not a limitation, the claim phrase "magnetic polarity" appears within the patent-related document associated with the second column 304, and there is literal support within the Detailed Description. Therefore, an "X" is present next to the claim phrase "magnetic polarity" in the second column 304. As another non-limiting example, the claim phrase "wire coil" appears within the claims of the patent-related document associated with the second column 304 but there is not literal support within the Detailed Description. Therefore, a "C" (or other graphical representation) is present next to the claim phrase "wire coil" in the second column 304.

Figure 7:
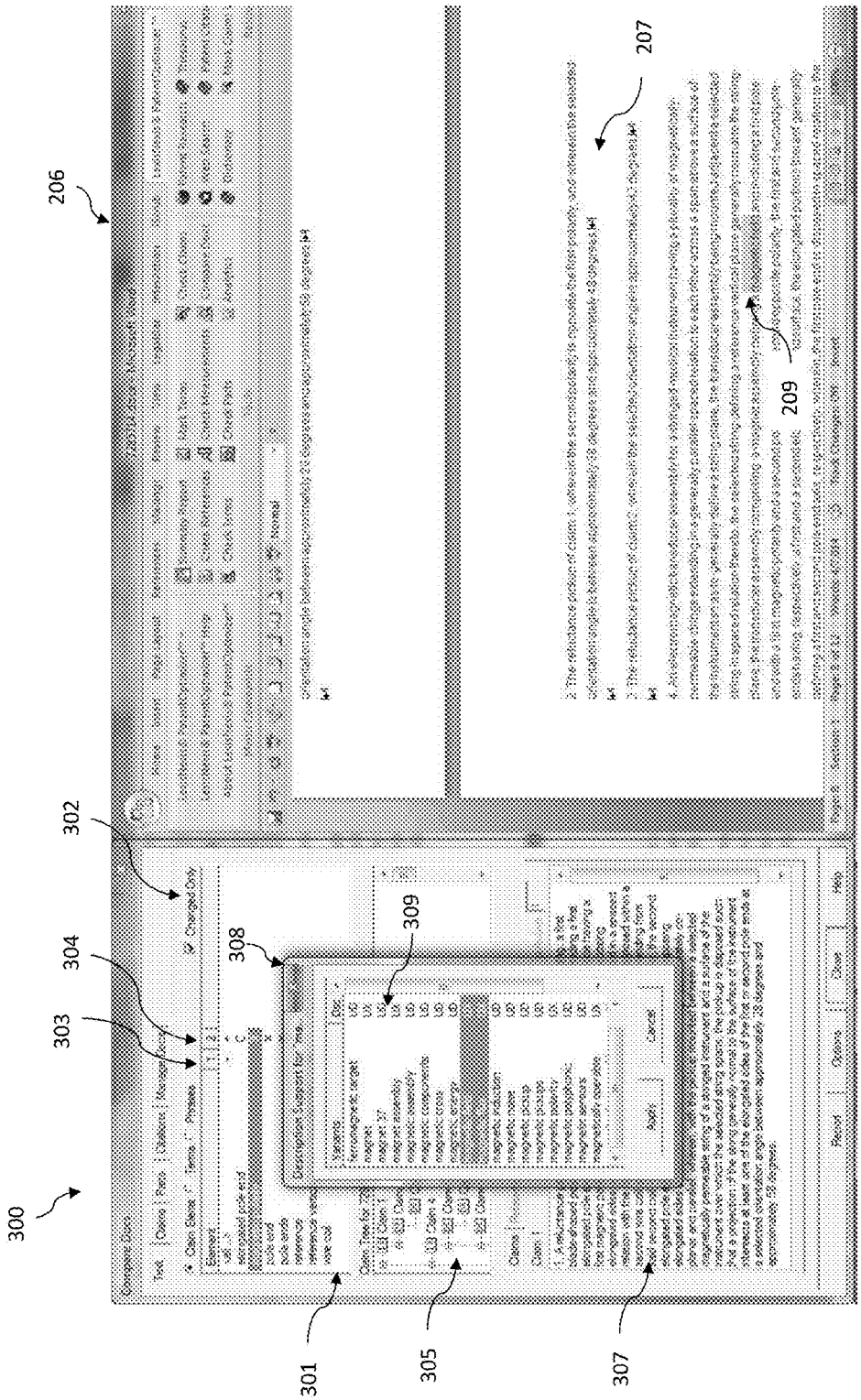

Therefore, claim terms and phrases may appear in one of the patent-related documents but not in the other. Therefore, there may not be literal support for a claim term or phrase appearing in a first patent-related document in a second, related patent-related document. Referring now to FIG. 7, embodiments of the present disclosure enable a user to associate claim terms and/or phrases appearing in one patent-related document with variants of the claim terms and/or phrases that appear in compared patent-related documents to therefore indicate non-literal, conceptual support between compared patent-related documents.

The graphical interface 300 may allow a user to select a claim term or phrase that appears in one patent-related document but not the other patent-related document (or multiple other patent-related documents). As an example and not a limitation, the system may allow a user to select a claim term or phrase by right-clicking the claim term or phrase with a mouse. This action may cause the system to generate variants of the selected claim term or phrase (e.g., by comparing the selected claim term or phrase with the parts thesaurus). The user may have the option to find structurally similar variants, conceptually similar variants, or both types of variants, as described above. The text of the compared patent-related documents may then be searched to determine if any of the variants are present within the compared patent-related documents.

A list of variants of the selected claim term or phrase that are used in the text of the compared patent-related documents may be presented to the user in a variant display 308. The variant display 308 lists such variants of the selected claim term or phrase. The user may then review the list of variants and select one or more as applicable. Selection of the variant(s) associates the selected variant(s) with the selected claim term or phrase. In some embodiments, the graphical interface 300 is then updated to indicate the association of the claim terms/phrases with selected variants. As an example and not a limitation, the first or second column may be populated with a "U" (or other graphical representation) when a user has indicated non-literal, conceptual support by selection of variants as described herein. In some embodiments, selection of a claim term or phrase not only highlights the claim term or phrase in the text of the patent-related document, but also highlights any selected variants within the text. Further, the system may also allow the user to navigate to instances of not only the selected claim term or phrase within the text of the patent-related document, but also to instances of any selected variants (e.g., highlighted claim term 209).

In the non-limiting illustrated example, the claim phrase "magnetic polarity" is selected by the user. The variant display 308 provides the user a list of variants of the claim phrase "magnetic polarity." The user has selected variants "magnetic field" and "magnetic flux," which then associates these variants with the claim phrase "magnetic polarity." The terms region 301 may then be updated with a "U" in the first column 303 and the row associated with the claim phrase "magnetic polarity." Further, instances of "magnetic polarity," "magnetic field," and "magnetic flux" may be highlighted in the text displayed in the word processing application window 206 (e.g., highlighted text "magnetic field" in FIG. 7). The system may also allow navigation to these terms within the text of the patent-related document.

In some embodiments, the variant display 308 also provides an indication 309 as to what type of support is provided for the listed variants. Variants found in the Detailed Description section may be indicated by a "UD" in column 309 (e.g., "ferromagnetic target" illustrated in FIG. 7). Variants found in the claims may be indicated by a "UC." Variants found in both the claims and the Detailed Description section may be indicated by a "UX." It should be understood that indicators other than "UD," "UC," and "UX" may be utilized.

Figure 8:
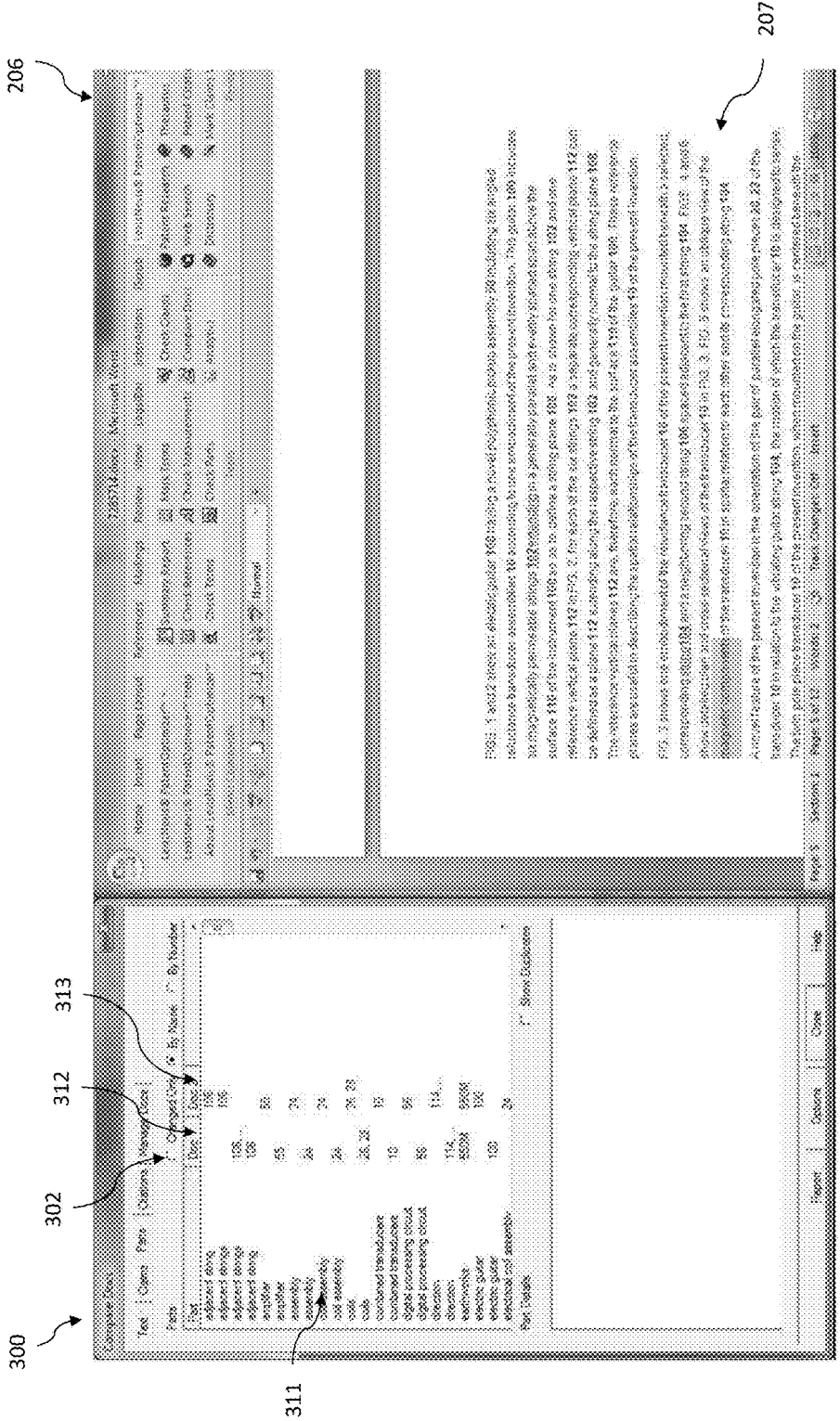

In some embodiments, parts may be compared between two or more documents. Referring now to FIG. 8, the graphical interface 300 is shown wherein a "Parts" 310 tab is selected to display a parts region 311. A "Changed Only" selection box 302 allows a user to view only those parts that have changed (or are otherwise different) between compared documents. FIG. 8 depicts the graphical interface 300 with the "Changed Only" selection box 302 as deselected. All of the numbered parts between the compared documents will appear in the parts region 311 when the "Changed Only" selection box 302 is deselected. Accordingly, embodiments of the present disclosure may allow a user to see the differences (and similarities) between parts and their respective part numbers between compared documents.

Figure 9A:
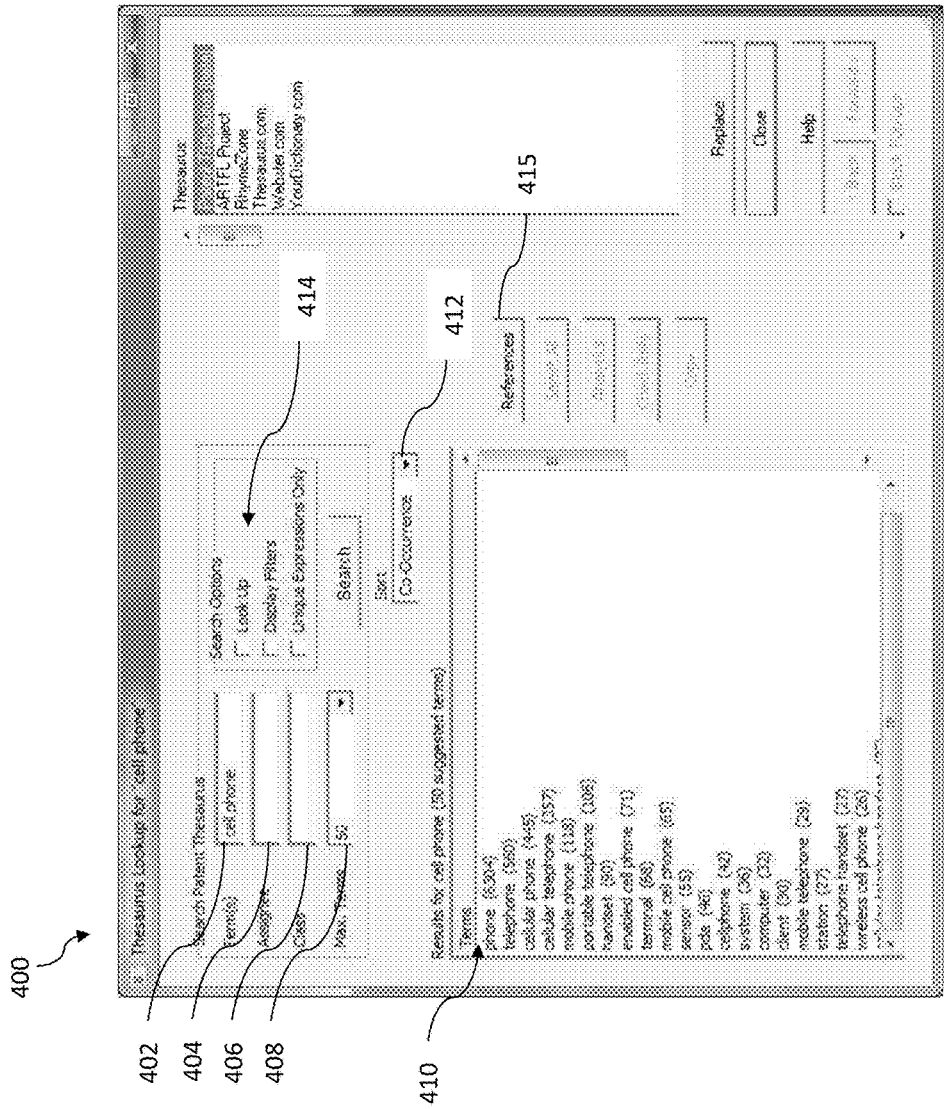
FIGS. 9A and 9B illustrate exemplary graphical interfaces of a thesaurus according to one or more embodiments described and illustrated herein.

Various embodiments of using a parts thesaurus will now be described. FIG. 9A illustrates a graphical interface 400, which may include an interface presented to a user for using a thesaurus. The user may use graphical interface 400, for example, to identify variants of user-input terms. As described above, a "variant" of a term may include one or more words associated with the term, such as words that are synonymous with the term. As shown in FIG. 9A, possible variants for the term "cell phone" may include the words "phone," "telephone," and "cellular phone." A variant of a term may also include words that frequently appear together with the term. As also shown in FIG. 9A, for example, variants for the term "cell phone" may also include the words "interface," "system," and "antenna."

Consistent with disclosed embodiments, several different methods may be used in determining variants, some of which are described above. In one exemplary method, drawing references in a patent-related document having different descriptions (i.e., part names) but the same identifier (i.e., part number) may be determined to be variants of one another. For example the drawing references "hollow tube 10," "cylindrical body 10," and "empty tube 10" appearing in a patent-related document may be determined to be variants of one another. In another exemplary method, a first set of variants in a first patent-related document may be linked with a second set of variants in a second patent-related document. For example, if the first set of variants includes the drawing reference "hollow tube 10," and the second set of variants includes the drawing reference "hollow tube 24," these references may be determined to be referring to the same part.

Referring once again to FIG. 9A, a search query comprising one or more terms may be input into input field 402, which is labeled as "Term(s)." Additional search criteria, such as assignee and class information for patent-related documents, may be input into input fields 404 and 406, labeled "assignee" and "class," respectively. Similarly, the maximum number of search results to display may be selected in input field 408, labeled "max. terms." Selection fields 412 and 414 may correspond to sort options and search options, respectively, and are discussed below with respect to FIGS. 11A, 11B and 12A-12C. The search results, which may correspond to a listing of variants of the search query, may be displayed in output area 410.

Figure 9B:
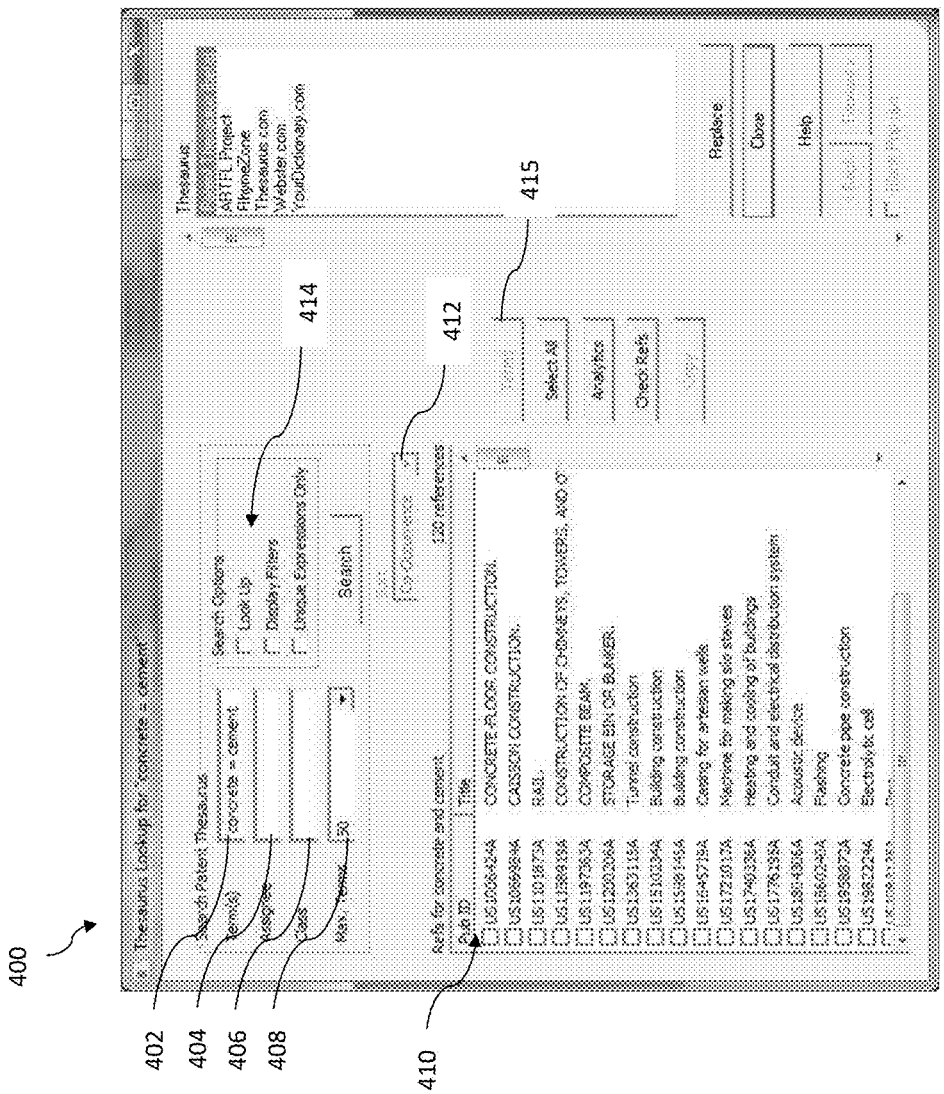

As will be discussed with reference to FIGS. 10A and 10B below, a user may select one or more of the variants to retrieve information corresponding to the patent-related documents in which the variants appear. FIG. 9B illustrates an additional format for inputting a search query into input field 402. Consistent with disclosed embodiments, entering a query in the format "X=Y" may correspond to a search for equivalents, such as a search for patent-related documents that use a first term X and a second term Y interchangeably. In the example provided in FIG. 9B, the search query "concrete=cement" may determine whether the terms "concrete" and "cement" have been discussed interchangeably in patent-related documents. Patent-related documents matching this criterion (and any other selected search criteria) may be listed in output area 410.

Terms may be determined to be used interchangeably by any number of methods. For example, a first term may be used interchangeable with a second term when the same part number is associated with both the first term and the second term, which are both part names. For example, the first term "hollow tube" and "cylindrical tube" may both have part number "10" assigned thereto. As another example, a patent-related document may positively recite that a first term is an equivalent to a second. As an example and not a limitation, a patent-related document may recite that "any fastener may be utilized, such as a screw, bolt or nail." In this example, screws, bolts and nails are equivalents and may be considered to be used interchangeably. The text of patent-related documents may be analyzed to determine such equivalents between terms.

Figure 10A:
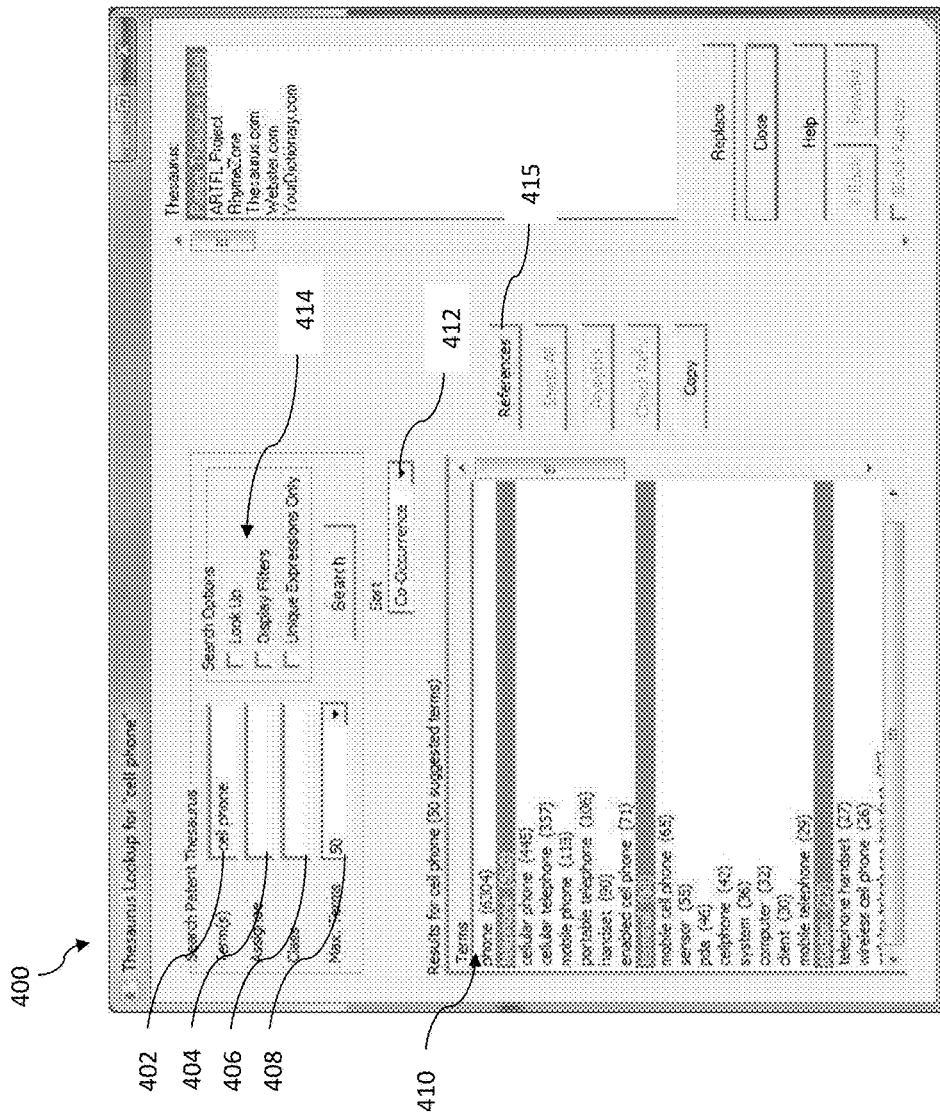
FIGS. 10A and 10B illustrate exemplary graphical interfaces of a thesaurus showing selection of variants and a listing of patent-related documents according to one or more embodiments described and illustrated herein.
Figure 10B:
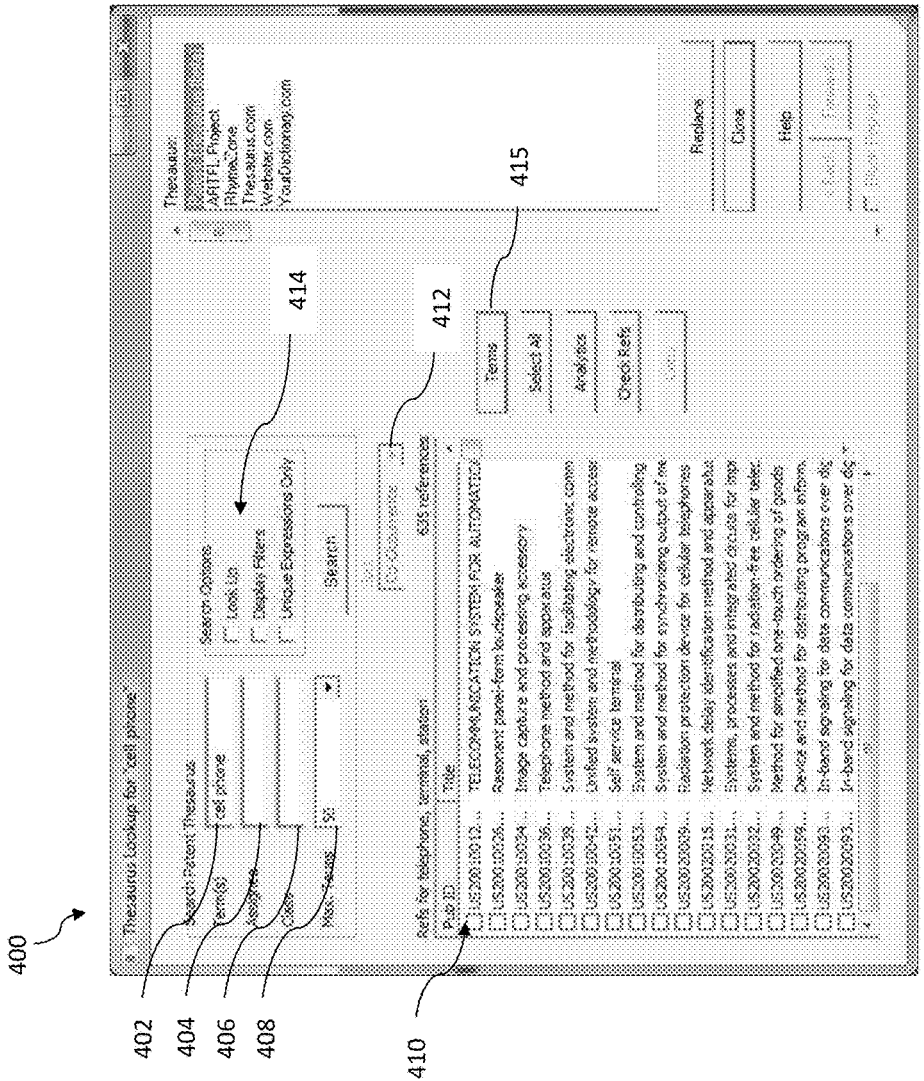

FIGS. 10A and 10B illustrate a graphical interface similar to the graphical interface 400 discussed with respect to FIGS. 9A and 9B. Accordingly, similar reference numerals may be used in the following discussion of FIGS. 10A and 10B. FIG. 10A illustrates the selection of a plurality of search term variants (i.e., "variants" or "term variants") listed in output area 410. Specifically, the variants "telephone (560)," "terminal (68)," and "station (27)" have been selected in FIG. 10A. The number in parenthesis next to each variant may indicate the number of patent-related documents meeting the search criteria in which the variant occurs. Based on the selection of variants, a listing of patent-related documents may then be listed in output area 410 upon selection of button 415, as shown in FIG. 10B. This listing may provide a citation identifier (e.g., patent number, published patent application number) and description (e.g., title) for each patent-related document, thereby displaying a plurality of citations.

Figure 11A:
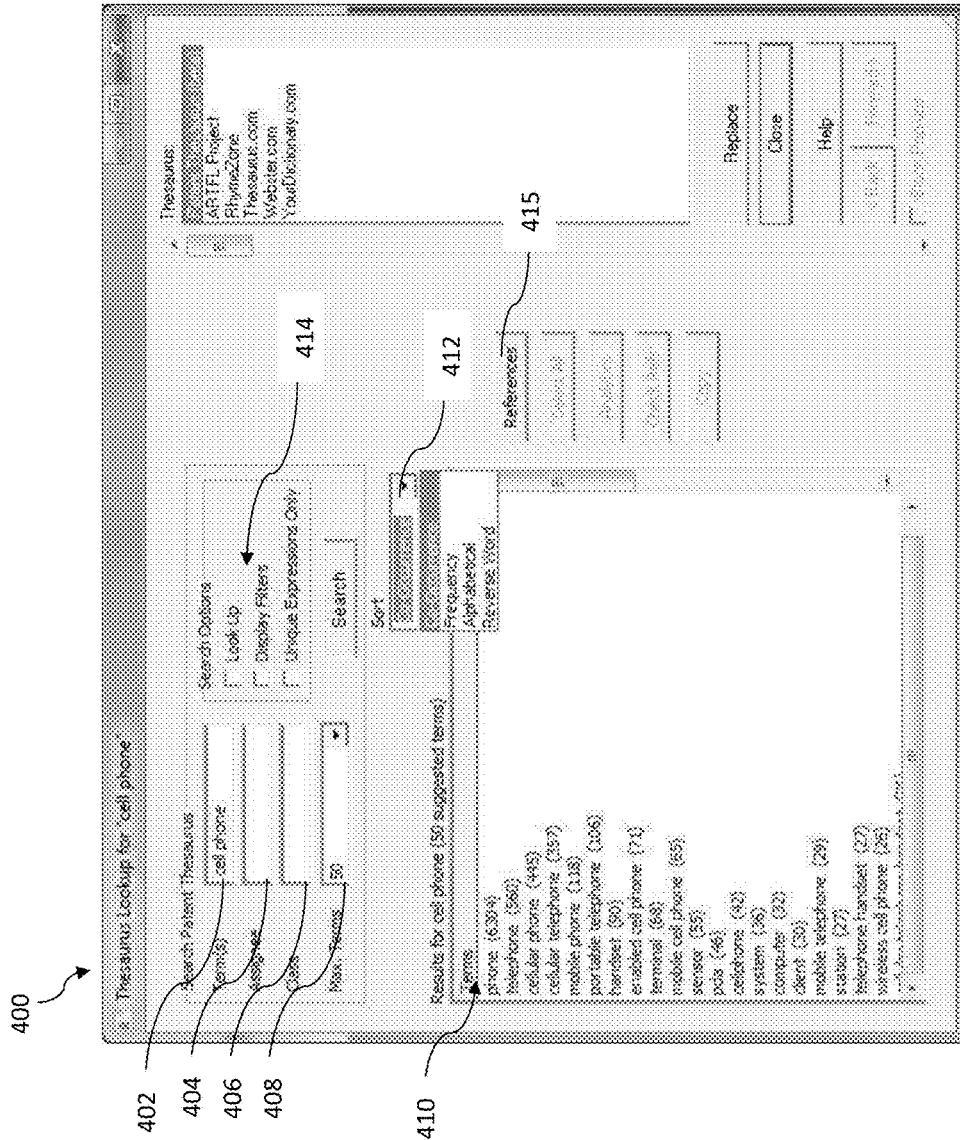
FIGS. 11A and 11B illustrate exemplary graphical interfaces of a thesaurus showing various sorting options according to one or more embodiments described and illustrated herein.
Figure 11B:
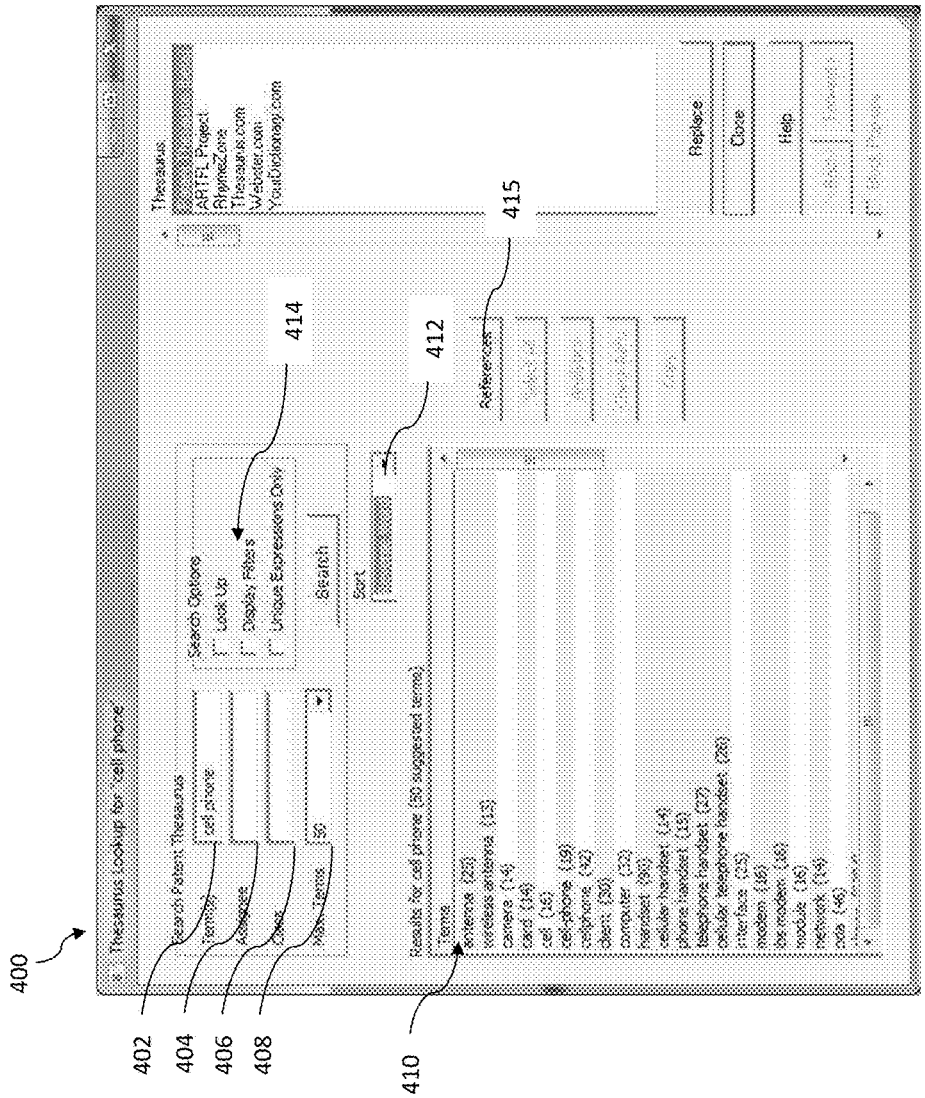

FIGS. 11A and 11B illustrate a graphical interface similar to the graphical interface 400 discussed above. Accordingly, similar reference numerals may be used in the following discussion of FIGS. 11A and 11B. FIG. 11A illustrates various sorting options 412 that may be applied to the search results to be listed in output area 410. The sorting options may include "co-occurrence," "frequency," "alphabetical," and "reverse word," and may be displayed in selection field 412 (e.g., in a drop-down menu format).

Selecting "co-occurrence" sorting option may sort the search results based on the total number of patent-related documents including both the search query (provided in to input field 402) and each respective term variant. In the illustrated example, the term variant "phone" co-occurs with the search term "cell phone" in the most number of patent-related documents.

Selecting "frequency" may sort the search results based on the cumulative number of times each respective variant appears within the set of patent-related documents. For example, as illustrated in FIG. 11A, while the variant "terminal (68)" may appear together with the search query term "cell phone" 68 times in patent-related documents, it may appear by itself in the set of patent-related documents a much greater number of times. Selecting the "alphabetical" sort option may sort the search results (i.e., the variants) in alphabetical order.

Finally, selection of the "reverse word" sorting option may sort the search results based on noun roots in reverse order. For instance, as shown in FIG. 11B, the variant "assistant (3)," which may be considered a noun root, is listed before other variants containing the word "assistant," such as "digital assistant (3)," (also a noun root) and "personal digital assistant (3)."

Figure 12A:
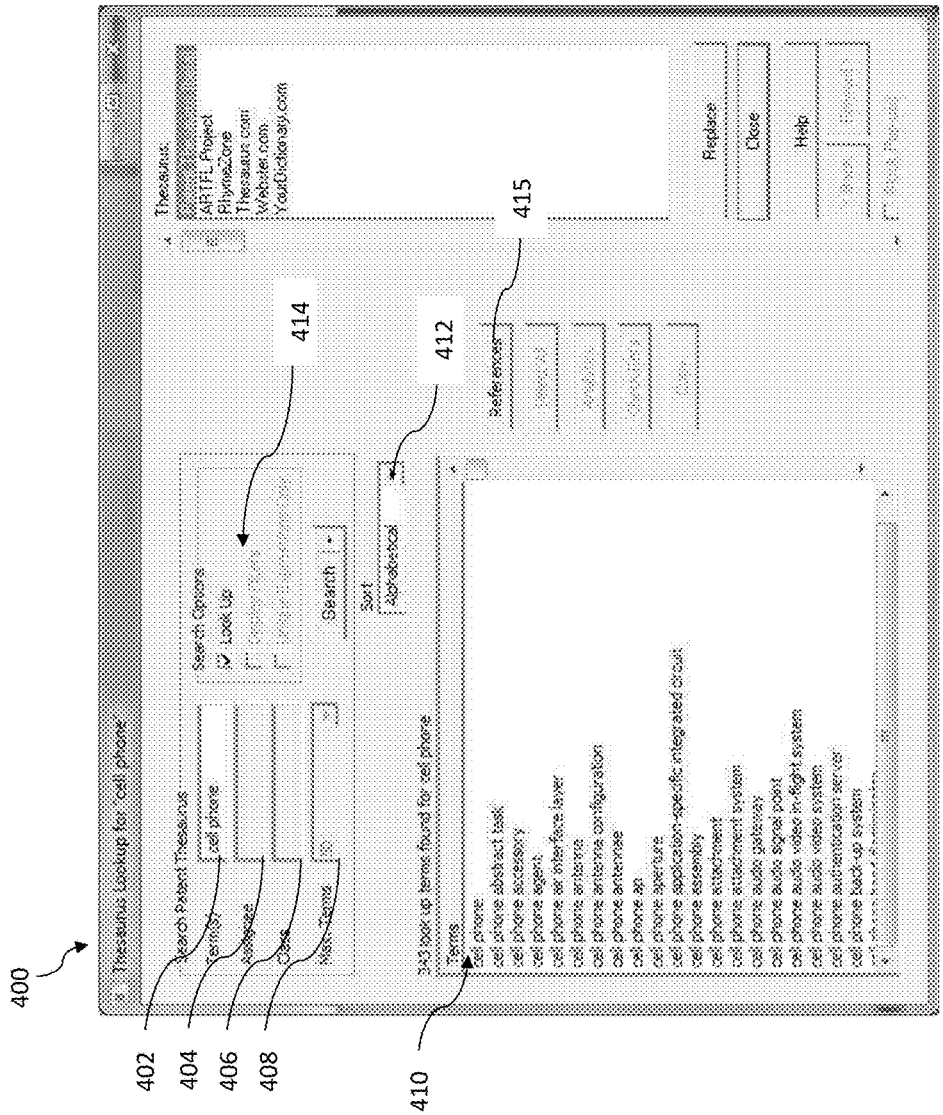
FIGS. 12A-12C illustrate exemplary graphical interfaces of a thesaurus showing various search options according to one or more embodiments described and illustrated herein.
Figure 12B:
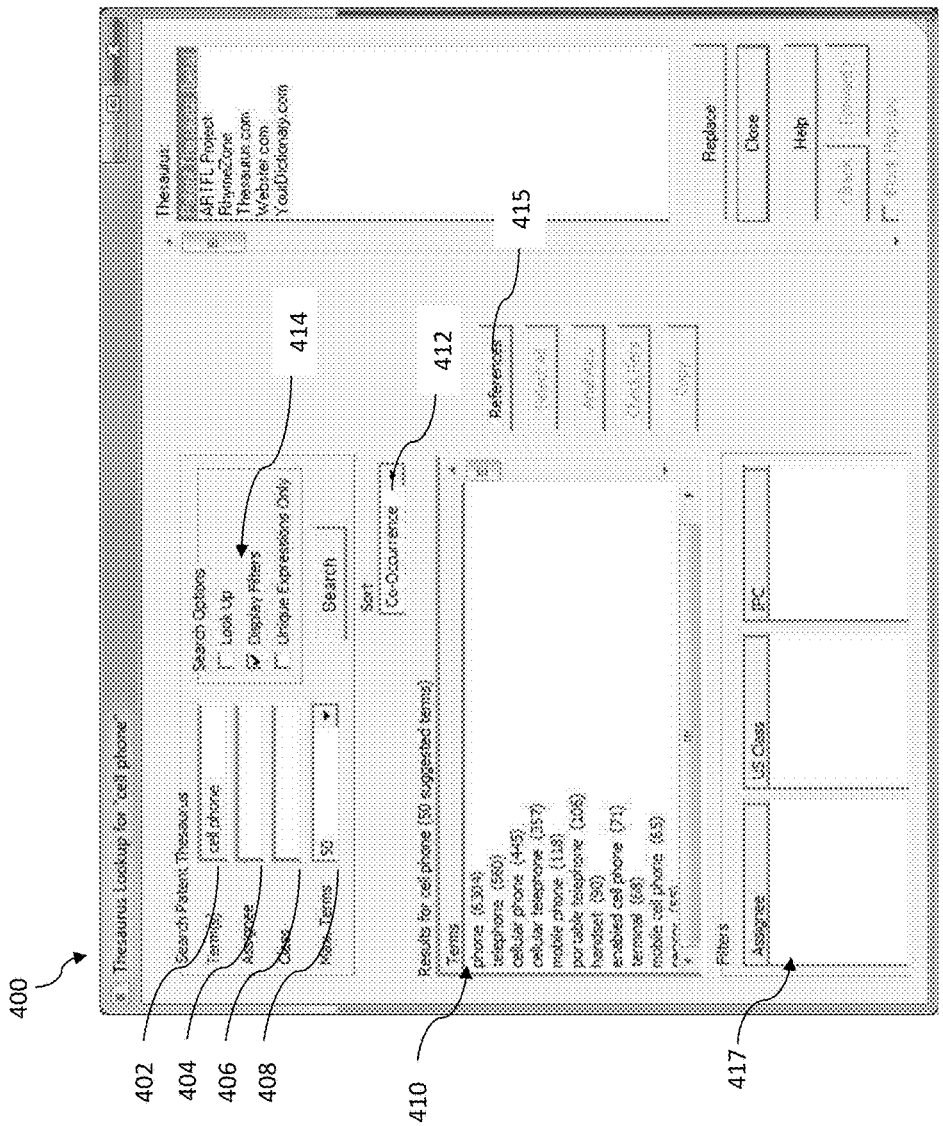
Figure 12C:
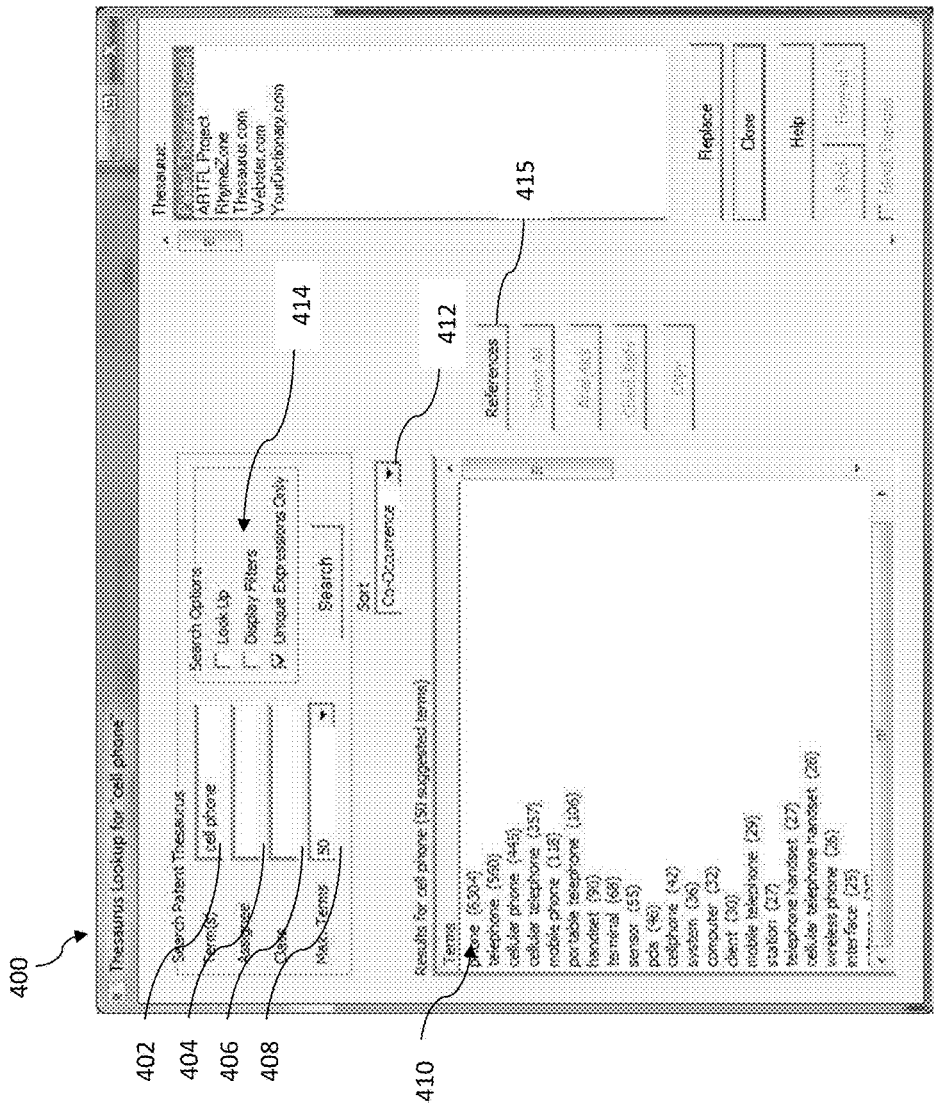

FIGS. 12A-12C illustrate a graphical interface similar to the graphical interface 400 described above. Accordingly, similar reference numerals may be used in the following discussion of FIGS. 12A-12C. FIGS. 12A-12C illustrate various search options that may be used in conjunction with other search criteria associated with a search query provided into input field 402. The search options may include "look up," "display filters," and "unique expressions only," and may be displayed in a selection field 414. It should be understood that more or fewer search options may be displayed in the selection field 414.

As shown in FIG. 12A, selecting the "look up" search option for the search query "cell phone" may provide a listing of terms beginning with the phrase "cell phone" in output area 410. The "look up" search option may also provide a listing of terms containing the phrase "cell phone" or ending with the phrase "cell phone." Selecting one of these terms may enable the retrieval of term variants related to the selection. In addition, the search option "display filters" may be used to filter term variants by bibliographic information. As illustrated in FIG. 12B, selecting the "display filters" search option may generate a set of filters beneath output area 410. The filters may, for example, include fields such as "assignee," "US class," and "IPC." Different values for one or more fields may be used as criteria to filter the term variants. Finally, the search option "unique expressions only" may be used to exclude term variants containing the word or phrase in the search query from the search results displayed in output area 410. For example, as illustrated in FIG. 12C, selecting "unique expressions only" when the search query is "cell phone" will exclude from the search results any term variant containing the phrase "cell phone."

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A computer-implemented method for searching for drawings found in a set of patent-related documents, the method comprising:
   receiving, by a computer, a search query;
   determining one or more variants of one or more terms within the search query by searching a parts thesaurus based at least in part on a parts index, wherein the parts thesaurus comprises a plurality of thesaurus entries, each entry comprises two or more grouped parts, each part comprises a part name and a part number, and the parts are grouped such that:
      at least two parts within an individual patent-related document having a same part number and no common words are grouped as a thesaurus entry in the parts thesaurus; and
      at least two parts within an individual patent-related document having a same part number with at least one common word are not grouped as a thesaurus entry in the parts thesaurus;
   searching the parts index for part names matching one or more terms in the search query and for part names matching the one or more variants, the parts index comprising the part names and the part numbers regarding the set of patent-related documents, wherein the part names and the part numbers are associated with drawings present in the set of patent-related documents;
   based upon searching the parts index, displaying an illustrated graphical interface comprising a drawing display region for displaying drawings of one or more selected patent-related documents meeting applied data filters wherein the data filters include filtering by part name, filtering by phrases, filtering by citation, and filtering by terms; and
   displaying one or more drawings, wherein the one or more drawings include at least one part name within the search query and the part name is stored within the parts index.

2. The computer-implemented method of claim 1, wherein the search query is based at least in part on a selection of a part name provided in a list.

3. The computer-implemented method of claim 1, wherein the parts index comprises a plurality of entries, each entry of the plurality of entries comprising a part name, a part number, and a patent-related document reference number.

4. The computer-implemented method of claim 1, further comprising receiving one or more filter option selections, and displaying the one or more selected drawings further based on the one or more filter option selections.

5. The computer-implemented method of claim 1, wherein parts are further grouped within the parts thesaurus by:
   determining a part within the parts index having one or more modification tokens;
   creating one or more new parts with a group by removing one or more of the modification tokens; and
   storing the part within the parts index having one or more modification tokens and the one or more new parts as grouped parts in an entry of the parts thesaurus.

6. The computer-implemented method of claim 1, wherein only parts appearing in a threshold number of patent-related documents are stored in the parts thesaurus.

7. The computer-implemented method of claim 1, wherein:
   noise words are removed from parts within the parts thesaurus; and
   parts including one or more noise words are stored in a parallel index and clustered according to one or more qualifiers.

8. The computer-implemented method of claim 7, wherein the noise words are at least one of prepositions and adjectives, and the one or more qualifiers are at least one of spatial indicators and physical property indicators.

9. The computer-implemented method of claim 1, wherein parts are further grouped within the parts thesaurus by:
   determining a part within the parts index having one or more modification tokens;
   creating one or more new parts with a group by removing one or more of the modification tokens; and
   storing the part within the parts index having one or more modification tokens and the one or more new parts as grouped parts in an entry of the parts thesaurus.

10. A computer-implemented method for searching for drawings found in a set of patent-related documents, the method comprising:
   receiving, by a computer, a request to search for drawings relating to a select drawing of a patent-related document;
   extracting one or more part numbers from the select drawing;
   determining, from a text of the patent-related document, one or more part names associated with the one or more part numbers;
   determining one or more variants of the one or more part names by searching a parts thesaurus based at least in part on a parts index, wherein the parts thesaurus comprises a plurality of thesaurus entries, each entry comprises two or more grouped parts, each part comprises a part name and a part number, and the parts are grouped such that:

at least two parts within an individual patent-related document having a same part number and no common words are grouped as a thesaurus entry in the parts thesaurus; and at least two parts within an individual patent-related document having a same part number with at least one common word are not grouped as a thesaurus entry in the parts thesaurus;

searching the parts index for the one or more part names and for part names matching the one or more variants, the parts index comprising the part names and the part numbers included in the set of patent-related documents, wherein the part names and the part numbers are associated with drawings present in the set of patent-related documents;

based upon searching the parts index, displaying an illustrated graphical interface comprising a drawing display region for displaying drawings of one or more selected patent-related documents meeting applied data filters wherein the data filters include filtering by part name, filtering by phrases, filtering by citation, and filtering by terms;

determining one or more drawings that illustrate the one or more part names; and displaying the one or more drawings.

11. The computer-implemented method of claim 10, wherein the one or more part numbers are extracted after receiving the request to search for drawings.

12. The computer-implemented method of claim 10, wherein the parts index comprises a plurality of entries, each entry of the plurality of entries comprising a part name, a part number, and a patent-related document reference number.

13. The computer-implemented method of claim 10, further comprising receiving one or more filter option selections, and displaying the one or more selected drawings further based on the one or more filter option selections.

14. The computer-implemented method of claim 10, wherein:

noise words are removed from parts within the parts thesaurus; and parts including one or more noise words are stored in a parallel index and clustered according to one or more qualifiers.

15. The computer-implemented method of claim 14, wherein the noise words are at least one of prepositions and adjectives, and the one or more qualifiers are one or more of spatial indicators and physical property indicators.

16. A computer-implemented method for searching for drawings found in a set of patent-related documents, the method comprising:

receiving, a by computer, a request to search for drawings relating to a select drawing of a patent-related document;

extracting one or more part numbers from the select drawing;

determining, from a text of the patent-related document, one or more part names associated with the one or more part numbers;

determining one or more variants of the one or more part names by searching a parts thesaurus based at least in part on a parts index, wherein the parts thesaurus comprises a plurality of thesaurus entries, each entry comprising two or more grouped parts, each part comprises a part name and a part number, and the parts are grouped such that each part of an entry ends with a same word and each part of the entry appears in a minimum number of patent-related documents;

searching the parts index for the one or more part names and for part names matching the one or more variants, the parts index comprising part names and part numbers included in the set of patent-related documents, wherein the part names and part numbers are associated with drawings present in the set of patent-related documents;

based upon searching the parts index, displaying an illustrated graphical interface comprising a drawing display region for displaying drawings of one or more selected patent-related documents meeting applied data filters wherein the data filters include filtering by part name, filtering by phrases, filtering by citation, and filtering by terms;

determining one or more drawings that illustrate the one or more part names; and displaying the one or more drawings.

17. The computer-implemented method of claim 16, wherein determining the one or more drawings comprises searching the parts index for drawings associated with the one or more part names.

18. The computer-implemented method of claim 16, wherein parts are further grouped within the parts thesaurus by:

determining a part within the parts index having one or more modification tokens;

creating one or more new parts with a group by removing one or more of the modification tokens; and storing the part within the parts index having one or more modification tokens and the one or more new parts as grouped parts in an entry of the parts thesaurus.

19. The computer-implemented method of claim 16, wherein:

noise words are removed from parts within the parts thesaurus; and parts including one or more noise words are stored in a parallel index and clustered according to one or more qualifiers.

20. The computer-implemented method of claim 19, wherein the noise words are at least one of prepositions and adjectives, and the one or more qualifiers are one or more of spatial indicators and physical property indicators.

* * * * *

UNITED STATES PATENT AND TRADEMARK OFFICE
CERTIFICATE OF CORRECTION

PATENT NO. : 10,115,170 B2
APPLICATION NO. : 14/323485
DATED : October 30, 2018
INVENTOR(S) : Brian K. Elias et al.

Page 1 of 1

It is certified that error appears in the above-identified patent and that said Letters Patent is hereby corrected as shown below:

On the Title Page

Item (73) Assignee Should read:
--LexisNexis, a division of Reed Elsevier Inc., Miamisburg, OH--

In the Claims

Column 18, Line 44, Claim 19 Should read:
--19. The computer-implemented method of claim 16, wherein:
    noise words are removed from parts within the parts thesaurus; and
    parts including one or more noise words are stored in a parallel index and clustered according to one or more qualifiers, wherein the noise words are at least one of prepositions and adjectives, and the one or more qualifiers are one or more of spatial indicators and physical property indicators.--

Column 18, Line 51, Claim 20 Should read:
--20. The computer-implemented method of claim 1, further comprising:
    determining a plurality of variants of terms within the search query by searching a parts thesaurus based at least in part on a parts index, wherein the variants comprise a structurally similar variant of a part and a conceptually similar variant of the part;
    performing text-to-drawing and drawing-to-drawing searches based upon the structurally similar variant part names and conceptually similar variant part names derived from the query variant terms;
    displaying a sorted and filtered drawing answer set corresponding to the text-to-drawing and drawing-to-drawing searches, wherein the drawing answer set is derived from at least one part name within the search query and the part name is stored within the parts index;
    receiving a selection of a drawing in the drawing set to identify drawings that are similar to the selected drawing; and
    retrieving and displaying drawings that are similar to the selected drawing.--

Signed and Sealed this
Second Day of April, 2019

Andrei Iancu
*Director of the United States Patent and Trademark Office*